United States Patent
Xiao et al.

(10) Patent No.: US 11,867,906 B2
(45) Date of Patent: Jan. 9, 2024

(54) WEARABLE AR SYSTEM AND AR DISPLAY DEVICE

(71) Applicant: Matrixed Reality Techology Co., Ltd., Wuxi (CN)

(72) Inventors: Bing Xiao, Beijing (CN); Xiaobin Liang, Beijing (CN); Chi Xu, Beijing (CN)

(73) Assignee: Matrixed Reality Techology Co., Ltd., Wuxi (CN)

( * ) Notice: Subject to any disclaimer, the term of this patent is extended or adjusted under 35 U.S.C. 154(b) by 534 days.

(21) Appl. No.: 16/991,186

(22) Filed: Aug. 12, 2020

(65) Prior Publication Data

US 2020/0371362 A1    Nov. 26, 2020

Related U.S. Application Data

(63) Continuation-in-part of application No. PCT/CN2019/074871, filed on Feb. 12, 2019.

(30) Foreign Application Priority Data

Feb. 12, 2018 (CN) .......................... 201810146739.1
May 17, 2018 (CN) .......................... 201810472324.3

(51) Int. Cl.
  *G02B 27/01* (2006.01)
  *G02B 27/14* (2006.01)
  *G02B 27/28* (2006.01)

(52) U.S. Cl.
  CPC ....... *G02B 27/0172* (2013.01); *G02B 27/144* (2013.01); *G02B 27/283* (2013.01);
  (Continued)

(58) Field of Classification Search
  CPC .............. G02B 27/0172; G02B 27/144; G02B 27/283; G02B 2072/0118; G02B 2072/0123
  (Continued)

(56) References Cited

U.S. PATENT DOCUMENTS

| | | | |
|---|---|---|---|
| 8,089,568 B1 | 1/2012 | Brown et al. | |
| 2004/0001679 A1* | 1/2004 | Sisodia | G02B 6/06 348/E5.145 |

(Continued)

FOREIGN PATENT DOCUMENTS

| | | |
|---|---|---|
| CN | 105629472 A | 6/2016 |
| CN | 106019591 A | 10/2016 |

(Continued)

OTHER PUBLICATIONS

JP-2008299303-A (Year: 2023).*
The examination communication received in the corresponding European application 19751963.0, dated Apr. 6, 2023.

*Primary Examiner* — Jerry L Brooks
(74) *Attorney, Agent, or Firm* — Kilpatrick Townsend & Stockton LLP

(57) ABSTRACT

An augmented reality (AR) display device is described. The display device includes a projection source; a first optical path having a first beamsplitter and a first reflector; and a second optical path having a second beamsplitter and a second reflector. The first and second reflectors each include a reflective film. Virtual image light emitted from the projection source and carrying virtual image information first passes through the first optical path where it is reflected at least twice and transmitted at least once by the first beamsplitter and the first reflector, then enters the second optical path where it is transmitted at least once and reflected at least twice by the second beamsplitter and the second reflector, and enters a human eye. Scene light from a real scene enters the human eye through the second optical path. A wearable AR system can include the AR display device and the projection source.

20 Claims, 9 Drawing Sheets

(52) U.S. Cl.
CPC ............... *G02B 2027/0118* (2013.01); *G02B 2027/0123* (2013.01)

(58) Field of Classification Search
USPC .......................................... 359/633
See application file for complete search history.

(56) References Cited

U.S. PATENT DOCUMENTS

| | | | |
|---|---|---|---|
| 2008/0013051 | A1 | 1/2008 | Glinski et al. |
| 2014/0347736 | A1 | 11/2014 | Liu et al. |
| 2015/0268401 | A1 | 9/2015 | Hugel et al. |

FOREIGN PATENT DOCUMENTS

| | | | | |
|---|---|---|---|---|
| CN | 205982838 | U | 2/2017 | |
| CN | 107037587 | A | 8/2017 | |
| CN | 107422484 | A | 12/2017 | |
| CN | 107589546 | A | 1/2018 | |
| CN | 107678165 | A | 2/2018 | |
| CN | 108681068 | A | 10/2018 | |
| EP | 1267197 | A2 | 12/2002 | |
| JP | 2008299303 | A * | 12/2008 | ........... G02B 6/2552 |
| RU | 2301436 | * | 6/2007 | ............. G02B 27/22 |
| RU | 2301436 | C2 | 6/2007 | |
| WO | 2012118573 | A1 | 9/2012 | |

\* cited by examiner

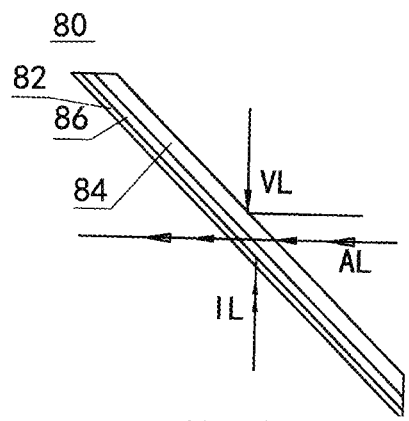
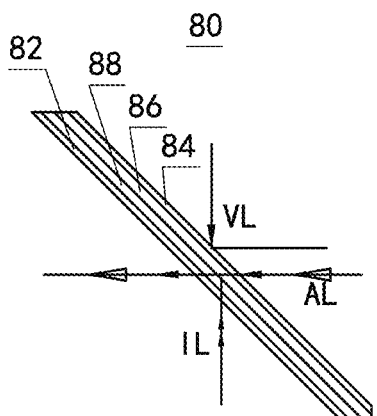
FIG. 8  FIG. 8a
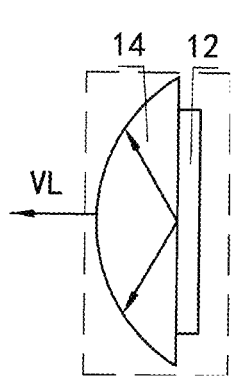
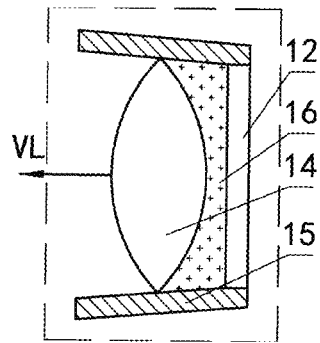
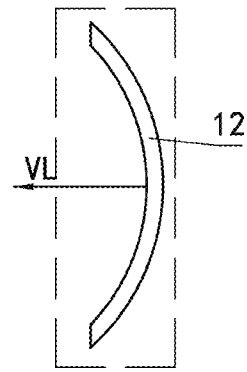
FIG. 9a  FIG. 9b  FIG. 10a
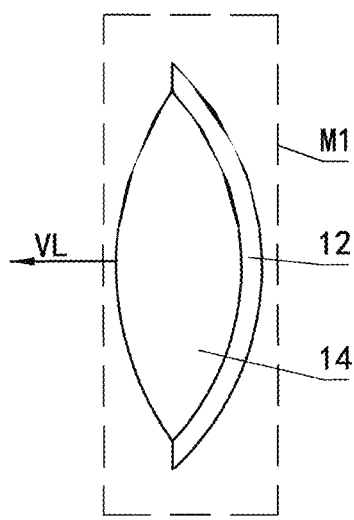
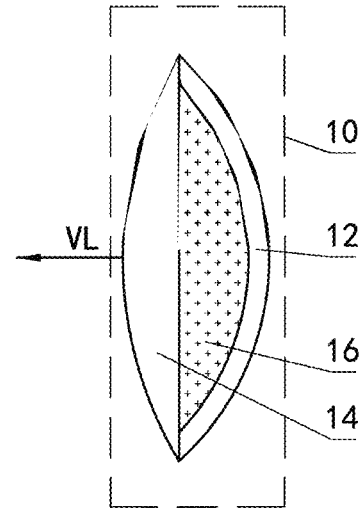
FIG. 10b  FIG. 10c

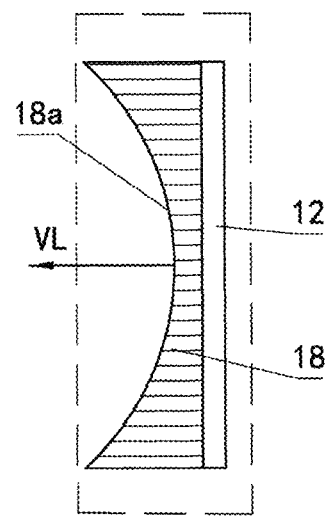
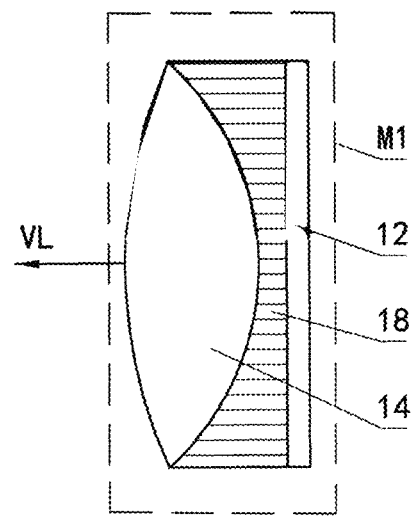
FIG. 11a   FIG. 11b
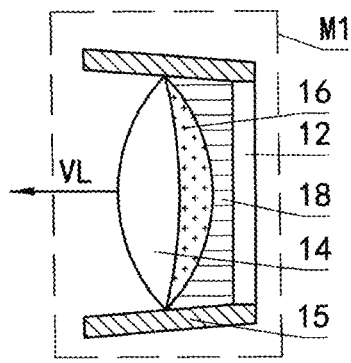
FIG. 11c
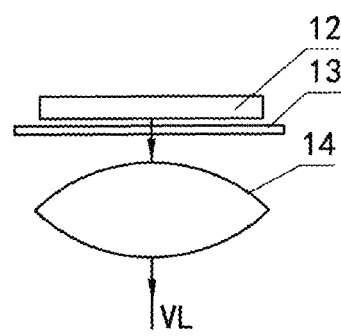
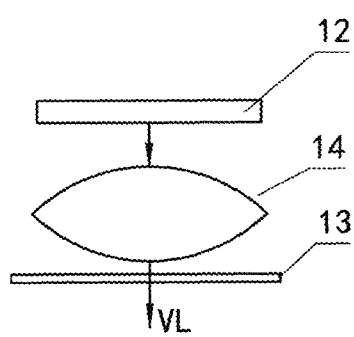
FIG. 12a   FIG. 12b

_

WEARABLE AR SYSTEM AND AR DISPLAY DEVICE

STATEMENT REGARDING FEDERALLY SPONSORED RESEARCH OR DEVELOPMENT

N/A

TECHNICAL FIELD

The present application relates to the field of Augmented Reality (AR) technology. In particular, the present application relates to a wearable AR system and its AR display device.

BACKGROUND OF THE INVENTION

Augmented Reality (AR) technology is a technology that combines and presents a virtual image and a real scene in real time. A basic optical principle of the augmented reality technology is to simultaneously project light with real scene information and light with virtual image information into a human eye, so that the information conveyed in the light of the two optical paths is merged in the human eye and a combined image comprised of the real scene and the virtual image is observed by the human eye, achieving an effect of augmented reality.

See-through display devices are key devices in augmented reality systems. Depending on different real scenes, the see-through display devices are classified into video see-through display devices and optical see-through display devices. Common augmented reality glasses or helmets (also known as AR glasses or AR helmets) are examples of the optical see-through AR display devices.

FIG. 1 is an optical schematic diagram of an existing AR display device, which mainly comprises a projection source 1, a lens 2 serving as a beam shaping element, a beamsplitter 3, and a curved reflector 4.

Virtual image light VL emitted from the projection source 1 and carrying virtual image information is incident onto the lens 2 and transmitted through the lens 2, achieving shaping of the light. The shaped virtual image light VL is incident on the beamsplitter 3, and at a beamsplitting side of the beamsplitter 3, a portion of the light is reflected onto the reflector 4 (while a portion of the light being transmitted through the beamsplitter 3 and disappearing in an external environment), and reflected by the reflector 4 back onto the beamsplitter 3 again. After being transmitted through the beamsplitter 3, the virtual image light VL enters the human eye E eventually. Scene light AL carrying real scene information is incident on the reflector 4 from an outside of the reflector 4 and transmitted through the reflector 4 and the beamsplitter 3, and enters the human eye E. In this way, the human eye E can observe the virtual image and the real scene simultaneously. Meanwhile, interference light IL is incident on the reflector 3 and reflected into the human eye E, which causes interference on an image observed by the human eye E.

For AR glasses, in order to be used by users who suffer poor eyesight, the AR display devices are provided with a refractive correction lens between the beamsplitter 3 and the human eye E, thus formed AR display devices having a more complicated structure and an increased weight, which requires a larger distance of exit pupil and a higher system performance.

Generally, existing AR display devices have one or more of the following main disadvantages: the optical system composed of various optical devices is less compact; the optical structure is too simple and thus has less design parameters that can provide freedoms of design, which results in a poor image quality, a low optical performance, a small field of view, a small diameter of exit pupil, a small distance of exit pupil, inconvenient manufacture or assemble for some devices, and poor mass production ability; in addition to the light with the virtual image information and the light with the real scene information which can enter the human eye, there is also interference light which can enter the human eye and causes interference on image quality and observation of the human eye; and a minor portion of the light is reflected and refracted many times in its optical path, generating "ghost images" or stray light, which affects the observation of the human eye.

It is desired to solve the above technical problems.

SUMMARY OF THE INVENTION

The present application greatly improves the freedoms of design of the optical system by providing two optical path modules each comprising a beamsplitter and a reflector. On this basis, in this application, many optical devices or modules in the optical system are further improved to solve one or more of the above technical problems.

To this end, according to one aspect, an augmented reality display device is provided which comprises: a projection source module comprising a projection source; a first optical path module comprising a first beamsplitter and a first reflector; and a second optical path module comprising a second beamsplitter and a second reflector, wherein the first beamsplitter and the second beamsplitter each comprise a beamsplitter substrate, and the first reflector and the second reflector each comprise a reflective film, wherein virtual image light emitted from the projection source module and carrying virtual image information passes through the first optical path module first, in which it is reflected at least twice and transmitted at least once by means of the first beamsplitter and the first reflector, then enters the second optical path module, in which it is transmitted at least once and reflected at least twice by means of the second beamsplitter and the second reflector, and enters a human eye eventually, and wherein scene light from real scene enters the human eye through the second optical path module.

In an embodiment, the virtual image light from the projection source module, along its propagation path:

enters the first optical path module first, in which it is sequentially transmitted through the first beamsplitter, reflected by the first reflector, and then reflected by the first beamsplitter, exiting the first optical path module; and then enters the second optical path module, in which it is sequentially reflected by the second beamsplitter, reflected by the second reflector, and then transmitted through the second beamsplitter, exiting the second optical path module and entering the human eye eventually;

enters the first optical path module first, in which it is sequentially transmitted through the first beamsplitter, reflected by the first reflector; and then reflected by the first beamsplitter, exiting the first optical path module; and then enters the second optical path module, in which it is sequentially transmitted through the second beamsplitter, reflected by the second reflector, and then reflected by the second beamsplitter, exiting the second optical path module and entering the human eye eventually;

enters the first optical path module first, in which it is sequentially reflected by the first beamsplitter, reflected by the first reflector, and then transmitted through the first beamsplitter, exiting the first optical path module; and then enters the second optical path module, in which it is sequentially reflected by the second beamsplitter, reflected by the second reflector, and then transmitted through the second beamsplitter, exiting the second optical path module and entering the human eye eventually; or enters the first optical path module first, in which it is sequentially reflected by the first beamsplitter, reflected by the first reflector, and then transmitted through the first beamsplitter, exiting the first optical path module; and then enters the second optical path module, in which it is sequentially transmitted through the second beamsplitter, reflected by the second reflector, and then reflected by the second beamsplitter, exiting the second optical path module and entering the human eye eventually.

In an embodiment, the projection source is a planar projection source or a curved projection source.

In an embodiment, the projection source module further comprises a beam shaping element configured for shaping the virtual image light from the projection source, the beam shaping element and the projection source being spaced apart from each other, or the beam shaping element and the projection source being directly bonded and integrated into a unitary piece with no gap therebetween.

In an embodiment, the projection source module further comprises a beam shaping element configured for shaping the virtual image light from the projection source, the beam shaping element being integrated with the projection source into a unitary piece indirectly via an intermediate matching component, wherein the intermediate matching member has a refractive index of 1 to 2.7; the intermediate matching member is formed from at least one of a group consisting of a liquid medium, a liquid crystal medium, a semi-solid medium, and a solid medium; or the intermediate matching member is formed from a liquid medium and/or a liquid crystal medium, and the projection source module further comprises a sealing structure for sealing a medium forming the intermediate matching member between the projection source and the beam shaping element.

In an embodiment, the projection source is a planar projection source with a fiber optic panel integrated thereon, the fiber optic panel being configured for receiving the virtual image light from the projection source.

In an embodiment, the projection source module further comprises a beam shaping element for shaping the virtual image light from the fiber optic panel, the beam shaping element and the fiber optic panel being spaced apart from each other, or the beam shaping element and the fiber optic panel being directly bonded and integrated into a unitary piece with no gap therebetween.

In an embodiment, the projection source module further comprises a beam shaping element configured for shaping the virtual image light from the fiber optic panel, the beam shaping element being integrated with the fiber optic panel into a unitary piece indirectly via an intermediate matching component, wherein the intermediate matching member has a refractive index of 1 to 2.7; the intermediate matching member is formed from at least one of a group consisting of a liquid medium, a liquid crystal medium, a semi-solid medium, and a solid medium; or the intermediate matching member is formed from a liquid medium and/or a liquid crystal medium, and the projection source module further comprises a sealing structure for sealing a medium forming the intermediate matching member between the beam shaping element and the fiber optic panel.

In an embodiment, the projection source is an integrated projection source, such as OLED or LCD.

In an embodiment, the projection source comprises a light source and an image source which are separated from each other, wherein the image source is LCOS, MEMS or DMD image source; and the projection source module further comprises a beam shaping element provided between the image source and the first optical path module and configured for integrating the virtual image light from the image source, and/or the projection source module further comprises a beam shaping element provided between the light source and the first optical path module and configured for integrating the light from the light source.

In an embodiment, the first beamsplitter and the second beamsplitter each are configured as polarizing beamsplitters comprising a polarizing beamsplitting film, and a first wave plate subassembly and a second wave plate subassembly are disposed between the first beamsplitter and the first reflector of the first light path module and between the second beamsplitter and the second reflector of the second light path module, respectively, and the first wave plate subassembly and the second wave plate subassembly are quarter-wave plates.

In an embodiment, both the first beamsplitter and the second beamsplitter are configured to allow a polarized light in a first direction to pass through while reflecting a polarizing light in a second direction, the first direction being perpendicular to the second direction.

In an embodiment, a half wave plate is provided between the first optical path module and the second optical path module.

In an embodiment, the first beamsplitter is configured to allow a polarized light in a first direction to pass through while reflecting a polarized light in a second direction, and the second beamsplitter is configured to allow the polarized light in the second direction to passes through while reflecting the polarized light in the first direction, the first direction being perpendicular to the second direction.

In an embodiment, the second beamsplitter further comprises a polarizing film which is configured to allow the polarized light in the first direction to pass through while absorbing the polarized light in the second direction, the virtual image light from the first optical path module being incident on the polarizing beamsplitting film first and then on the polarizing film.

In an embodiment, the second beamsplitter further comprises a beamsplitter wave plate, the virtual image light incident on the second beamsplitter being sequentially incident on the polarizing beamsplitting film, the polarizing film and the beamsplitter wave plate, and optionally, the beamsplitter wave plate is used as the beamsplitter substrate.

In an embodiment, the first beamsplitter and/or the second beamsplitter are configured as a planar beamsplitter or a cubic beamsplitter.

In an embodiment, the projection source module further comprises a projection source polarizing subassembly, the virtual image light from the projection source being incident on the polarizing subassembly first and then transmitted out of the projection source module.

In an embodiment, the projection source polarizing subassembly is disposed between the projection source and the first beamsplitter of the first optical path module;

the projection source module comprises a beam shaping element configured for shaping the virtual image light from the projection source, the projection source polarizing subassembly being disposed between the projection source and the beam shaping element or between the beam shaping element and the first beamsplitter of the first optical path module; or the projection source comprises a light source and an image source which are separated from each other, the projection source polarizing subassembly being disposed between the light source and the first beamsplitter of the first optical path module.

In an embodiment, the projection source polarizing subassembly is a polarizing film and/or a polarizing beamsplitting film and/or a projection source wave plate.

In an embodiment, each of the first wave plate subassembly and the second wave plate subassembly is provided as a separate component; or the first wave plate subassembly and the second wave plate subassembly are integrated to the first reflector and the second reflector, respectively.

In an embodiment, the first wave plate subassembly and the second wave plate subassembly are integrated to the first reflector and the second reflector, respectively, and the first wave plate subassembly and the second wave plate subassembly serve as reflector substrates for the first reflector and the second reflector, respectively.

In an embodiment, either or both of the first reflector and the second reflector further comprises a reflector substrate, the reflective film being disposed on either side of the reflector substrate, and the reflective film being disposed on the other side of the reflector substrate opposite to an incident side of the virtual image light.

In an embodiment, the reflective film of the first reflector is a total reflective film or a semi-reflective film, and the reflective film of the second reflector is a semi-reflective film.

In an embodiment, the reflector substrate of the second reflector is a refractive correction substrate, the virtual image light incident on the reflector being incident on the refractive correction substrate first and then on the semi-reflective film or being incident on the semi-reflective film first.

In an embodiment, either or both of the first reflector and the second reflector further comprises an antireflection film, the virtual image light from the second beamsplitter and the second wave plate subassembly when incident on the corresponding reflector being transmitted through the antireflection film of the reflector first and then entering the reflector substrate and the semi-reflective film.

In an embodiment, the second reflector further comprises a reflector wave plate and a reflector polarizing film, for the virtual image light incident on the second reflector from the second beamsplitter and the second wave plate subassembly, a portion of the light which is transmitted through the reflective film of the second reflector being transmitted through the reflector wave plate of the second reflector and converted to a polarization light which can be absorbed by the reflector polarizing film and then being absorbed by the reflector polarizing film, and the reflector wave plate is a quarter-wave plate.

In an embodiment, the reflector wave plate and the reflector polarizing film are separated from each other, or the reflector wave plate and the reflector polarizing film are bonded together with no gap to form a unitary piece.

In an embodiment, the reflector wave plate and the reflector polarizing film are integrally curved in a lateral direction of a head of a wearer wearing the augmented reality display device and/or in a longitudinal direction perpendicular to the lateral direction, to substantially follow the shape of the second reflector, and both of them as a whole are bonded to the semi-reflective film with no gap after being curved integrally as described above.

In an embodiment, the second reflector further comprises an outermost protective lens along an incident direction of the virtual image light incident onto the second reflector from the second beamsplitter, the protective lens being a light energy attenuating lens or an electrochromic lens or a photochromic lens.

The application also provides a wearable augmented reality system comprising the augmented reality display device, wherein the wearable augmented reality system is augmented reality glasses or an augmented reality helmet or an augmented reality mask.

BRIEF DESCRIPTION OF THE VIEWS OF THE DRAWINGS

The principle of the present application will be described in detail with reference to several embodiments shown in drawings, in order to describe and illustrate the above and other features and advantages of the present application more clearly and thoroughly. It should be understood for those skilled in the art that the embodiments shown in the drawings are only a part of embodiments of the present application given for the purpose of describing and illustrating the principle of the present application, and are not all embodiments of the present application. In order to highlight the principle of the present application, the drawings are not depicted to scale, and only optical diagrams of the present application are shown. In the drawings:

FIGS. 8 and 8a show two alternative embodiments of a beamsplitter that can be used in the AR display device of FIG. 6;

FIGS. 9a-9b show two alternative embodiments of a projection source module in an AR display device of the present application;

FIGS. 10a-10c show further three alternative embodiments of a projection source module in an AR display device of the present application;

FIGS. 11a-11c show yet further three alternative embodiment of a projection source module in an AR display device of the present application;

FIGS. 12a-12b show still further two alternative embodiments of a projection source module in an AR display device of the present application;

DETAILED DESCRIPTION OF THE INVENTION

Figure 1:
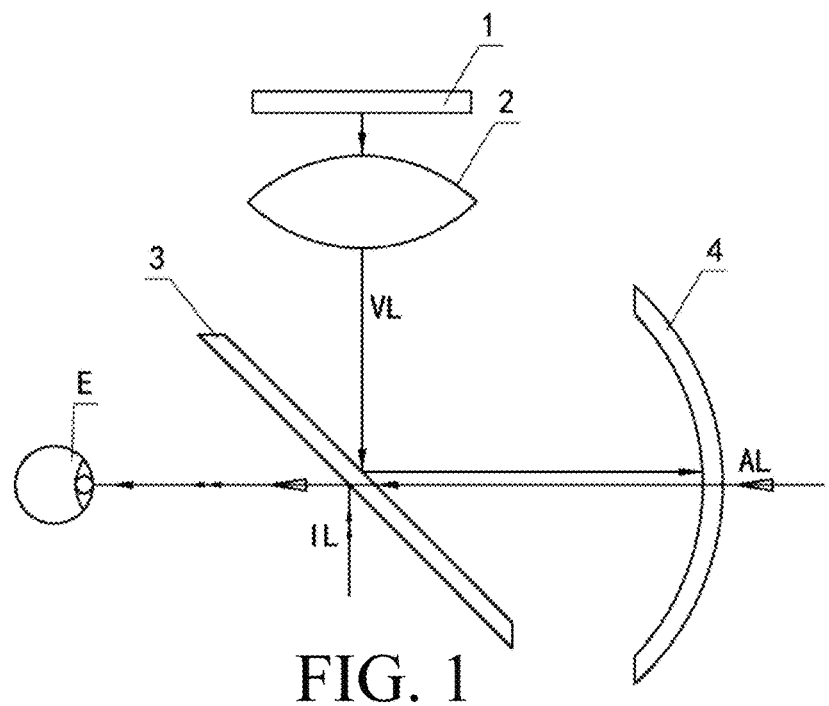
FIG. 1 shows an embodiment of an AR display device in prior art.

A wearable AR system according to the present application can be AR glasses, an AR helmet or an AR mask comprising an AR display device according to the present application. The AR display device of the present application generally comprises a projection source module and an optical path module. The projection source module is configured for providing light carrying virtual image information (hereinafter also referred to as virtual image light VL), and the optical path module is configured for enabling the virtual image light from the projection source module and scene light from real scene (identified by scene light AL in the drawings and in the following description) to enter a human eye through transmission, reflection or any combination thereof, and is configured as a combination of a series of optical devices arranged in a certain positional relationship.

In order to solve, or solve to some extent, at least one of the problems mentioned in the background art, and to improve freedoms of design of the AR display device, the AR display device according to the present application comprises two optical path modules, and each comprises a reflector and a beamsplitter.

Before detailed description is presented with reference to the drawings, following notes are given: 1) for convenience, parts or components having the same or similar functions or structures are identified with the same reference signs throughout the drawings; 2) in the specification and claims, the terms "first", "second" and "third" etc. are used merely to distinguish objects or parts or components having the same terminology, and are not intended to impose numerical limitations on the objects or parts or components; 3) the terms "comprise", "comprising", "include" and "including" are open-end and mean that, in addition to elements listed after these terms, a system, an apparatus, a device or a method step of the invention which is stated can also comprises other elements, parts or components, which should be considered to fall within the scope of the claims; and 4) in the specification and claims, an object with no quantity limitations can comprise one, two or more objects, and that is to say, the number of the elements is not limited.

In the present application, the term "beamsplitter" (or "ordinary beamsplitter") refers to any optical device or any combination of optical devices which is capable of splitting light incident on a beamsplitting side of the beamsplitter into at least two light portions (generally, a reflected light portion and a refracted or transmitted light portion). Generally, the beamsplitter can be cubic or planar. The beamsplitter comprises the beamsplitting side. In cases that the beamsplitter is a cubic beamsplitter, it is usually formed with two right angled isosceles triangle prisms, bevels of which are bonded to each other to form the beamsplitting side of the beamsplitter. In cases that the beamsplitter is a planar beamsplitter, the beamsplitting side of the beamsplitter is parallel to a surface of the beamsplitter on which the light is incident. The light incident on the beamsplitting side of the beamsplitter is partially reflected and partially refracted, splitting the light into the reflected light portion and the refracted light portion. A beamsplitting film or a polarizing beamsplitting film of the beamsplitter defines the beamsplitting side, and the beamsplitting film or the polarizing beamsplitting film comprises an effective portion which can be a one-layer or multiple-layer structure having a thickness of tens of nanometers to hundreds of micrometers. In cases that the polarizing beamsplitting film is used, in addition to the effective portion, it can comprise a base film having a thickness of tens of micrometers to hundreds of micrometers and providing functions of support and protection. In the present specification, although the description is given with regard to the beamsplitting side of the beamsplitter as an example, reflection does not necessarily occur only on the beamsplitting side of the beamsplitter, but can occur within an entire effective thickness of the beamsplitting film or the polarizing beamsplitting film of the beamsplitter.

In the present application, the term "polarizing beamsplitter" refers to a beamsplitter comprising a polarizing beamsplitting film and having a polarization function, and the polarizing beamsplitting film is coated to or bonded to or otherwise integrated with a beamsplitter substrate to form a unitary piece. The polarizing beamsplitting film is configured to allow a polarized light having a polarization state in a first direction to pass through while reflecting a polarized light having a polarization state in a second direction, the first direction and the second direction being perpendicular to each other. In the present application, an ordinary beamsplitter without the polarization function means a beamsplitter substrate. In an embodiment, the beamsplitter substrate has a diopter of 0~800°.

In the present application, the term "film" or "sheet" generally refers to a thin layer structure, which can be a thin layer structure attached to another "film" or "sheet" or a thin layer structure that stands alone.

In the present application, the term "reflector" as used herein refers to a "semi-reflector" which usually consists of a reflector substrate and a semi-reflective film (also referred to as a "semi-transflective film"), unless otherwise specified. Light propagating in a first direction and incident thereon can be partially reflected back by the reflector or, in particular, by the semi-reflective film and partially transmitted through the reflector, and light propagating in a second direction opposite to the first direction and incident thereon are at least partially transmitted through the reflector. In the present application, the term "reflective film" can be the semi-reflective film described as above, or can be a total reflective film that does not allow the light propagating in the second direction to pass through. In an embodiment, the reflector substrate has a diopter of 0~800°.

In the present application, although all the reflectors are shown as curved reflectors in the drawings, those skilled in the art understand that the reflectors in the various embodiments of the present application can be planar reflectors, unless otherwise specified.

In the drawings of the present application, for clarity, the light carrying the virtual image information is referred to as the virtual image light and is identified with a reference sign VL by a relatively larger solid arrow, light carrying real scene information is referred to as scene light and identified with a reference sign AL by a hollow arrow, and interference light is identified with a reference sign IL by double solid arrows which are relatively smaller.

Three basic embodiments of an AR display device of the present application comprising two optical path modules will be described below with reference to FIGS. 2-4.

Figure 2:
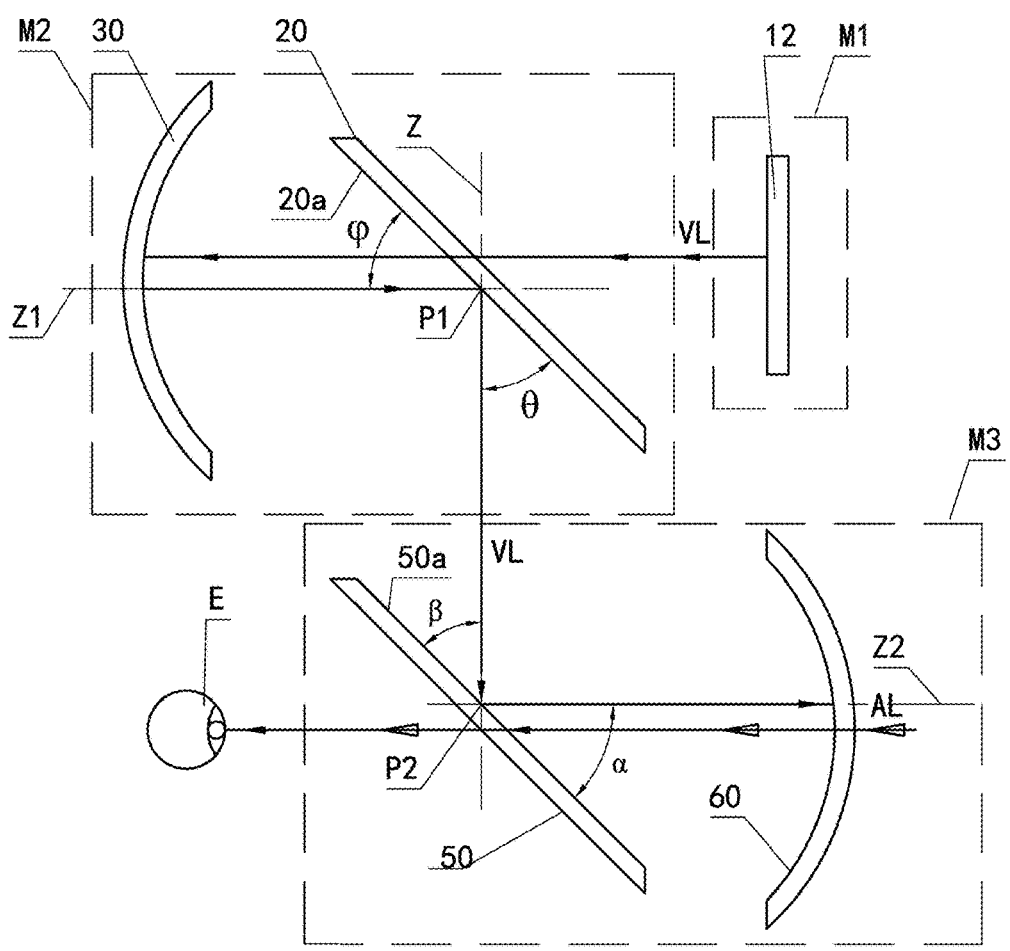
FIGS. 2-4 show first, second and third embodiments of an AR display device according to the present application.
Figure 3:
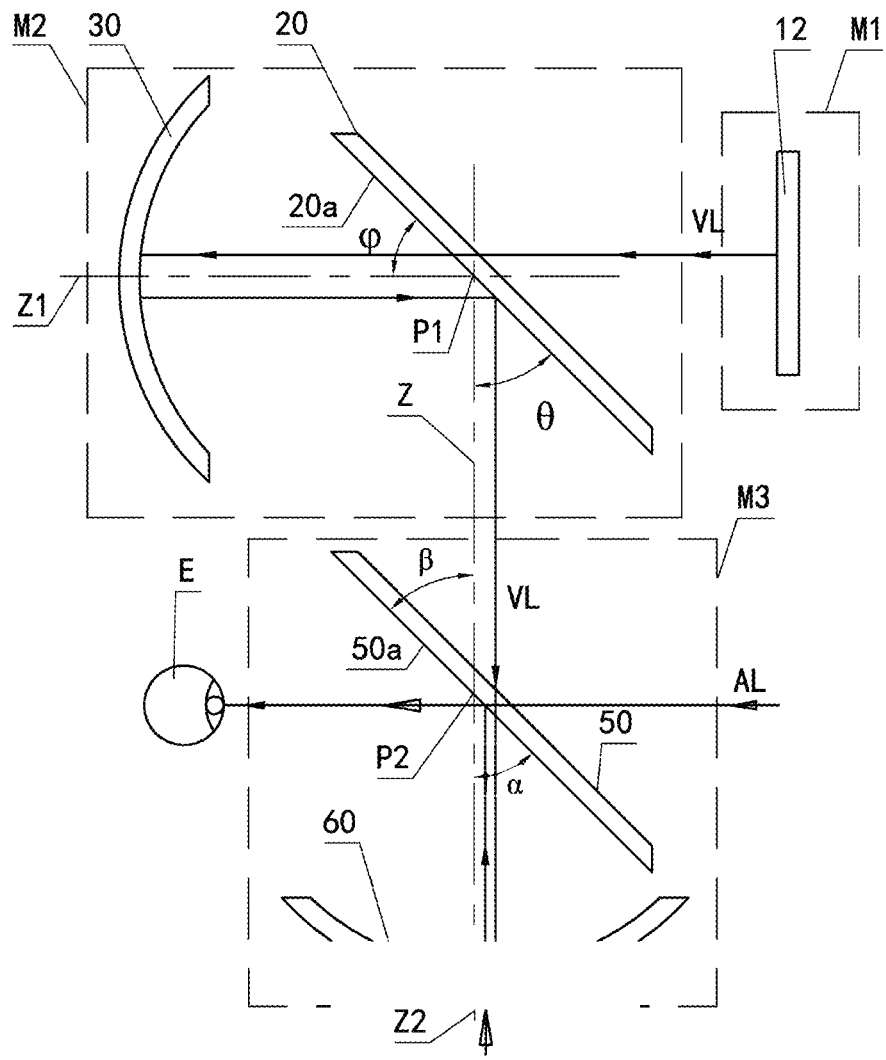
Figure 4:
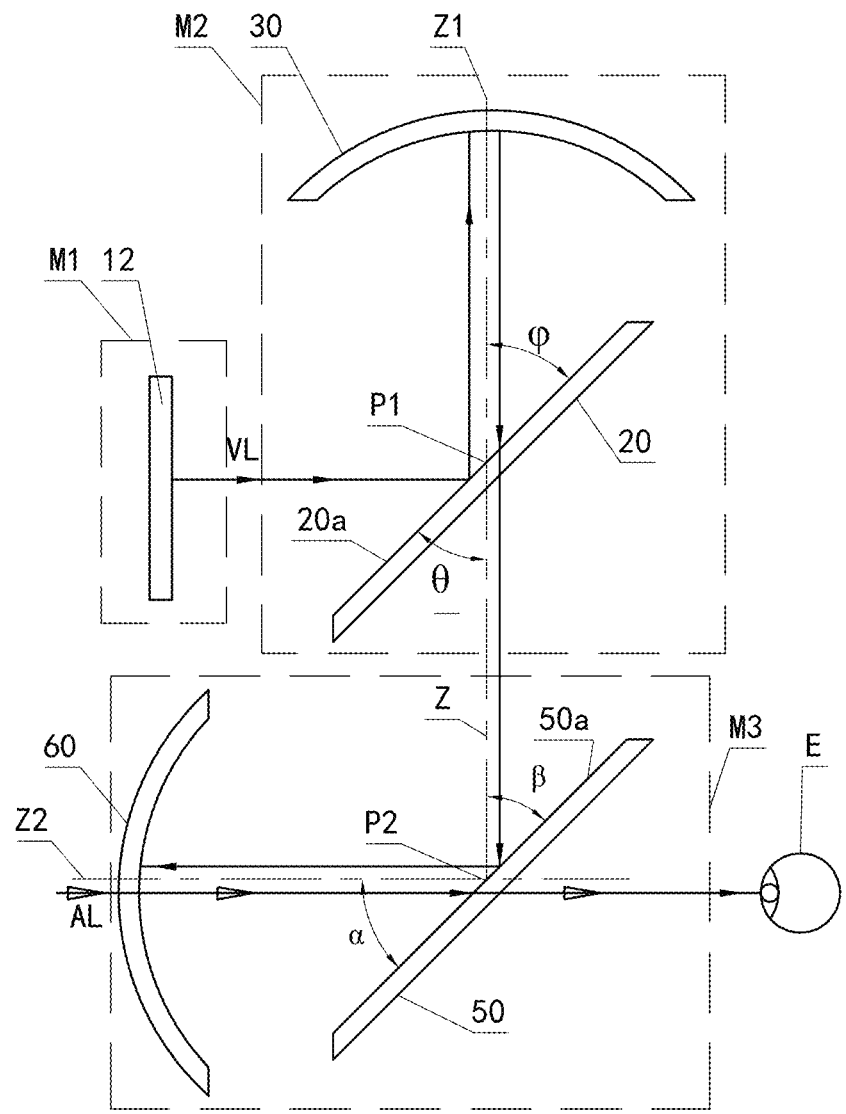

The AR display devices shown in FIGS. 2-4 each comprise a projection source module M1, a first optical path module M2, and a second optical path module M3. In the three basic embodiments, the projection source module M1 comprises only a projection source 12, the first optical path module M1 comprises a first beamsplitter 20 and a first reflector 30, and the second optical path module M2 comprises a second beamsplitter 50 and a second reflector 60. It should be noted that the reflector in the embodiments of the present application are all described with regard to a semi-reflector as an example. However, the first reflector 30 of the first optical path module M1 can also be a total reflector comprising a total reflective film, and the second reflector 60 of the second optical path module M2 can only be a semi-reflector of a general meaning which comprises a semi-reflective film. According to the present application, a reflective film of the first reflector 30 and/or the second reflector 60 can be disposed on either side of a reflector substrate, and on a side opposite to an incident side of the virtual image light VL so that the light will be transmitted through the reflector substrate before or after being reflected by the reflective film of the reflector, achieving the object of improving the freedoms of design of the optical system under otherwise equal condition.

The projection source module M1 is configured for emitting the virtual image light VL carrying the virtual image information. The virtual image light VL emitted from the projection source module M1 propagates through the first optical path module M2 and the second optical path module M3 sequentially, and then enters a human eye E. The scene light AL carrying the real scene information propagates only through the second optical path module M3 and enters the human eye E.

In the first basic embodiment of FIG. 2, the virtual image light VL emitted from the projection source 12 of the projection source module M1 is, sequentially along its traveling path, transmitted through the first beamsplitter 20, reflected by the first reflector 30, reflected by the first beamsplitter 20 (exiting the first optical path module M2 and entering the second optical path module M3), reflected by the second beamsplitter 50, reflected by the second reflector 60, and transmitted through the beamsplitter 50, entering the human eye E eventually.

In a second form of FIG. 3, the virtual image light VL emitted from the projection source 12 of the projection source module M1 is, sequentially along its traveling path, transmitted through the first beamsplitter 20, reflected by the first reflector 30, reflected by the beamsplitter 20 (exiting the first optical path module M2 and entering the second optical path module M3), transmitted through the second beamsplitter 50, reflected by the second reflector 60, and reflected by the second beamsplitter 50, entering the human eye E eventually.

In a third form of FIG. 4, the virtual image light VL emitted from the projection source 12 of the projection source module M1 is, sequentially along its traveling path, reflected by the first beamsplitter 20, reflected by the first reflector 30, transmitted through the beamsplitter 20 (exiting the first optical path module M2 and entering the second optical path module M3), reflected by the second beamsplitter 50, reflected by the second reflector 60, and transmitted through the second beamsplitter 50, entering the human eye E eventually.

In an embodiment not shown in the drawings, the first optical path module M2 of the third form of FIG. 4 is used in combination with the second optical path module M3 of the second form of FIG. 3. In particular, the virtual image light VL emitted from the projection source 12 of the projection source module M1 is, sequentially along its traveling path, reflected by the first beamsplitter 20, reflected by the first reflector 30, transmitted through the first beamsplitter 20 (exiting the first optical path module M2 and entering the second optical path module M3), transmitted through the second beamsplitter 50, reflected by the second reflector 60, and reflected by the second beamsplitter 50, entering the human eye E eventually.

As can be seen from the above description, by providing the AR display devices according to the basic embodiments of the present application with the two optical path modules M2 and M3, each comprising the beamsplitter and the reflector, the virtual image light VL is reflected at least twice and transmitted at least once when passing through each of the first optical path module M2 and the second optical path module M3. Compared with the AR display device in the prior art, the AR display device of the present application is provided with many more optical devices which can affect the traveling and propagating of the virtual image light VL and provide many design parameters, optical parameters and/or installation parameters which can be adjusted or changed by the designer. This improves the freedoms of design of the entire optical system, achieves a technical effect of an enlarged field of view, and facilitates to optimize a final image observed by the human eye.

As shown in FIGS. 2-4, the first reflector 30 of the first optical path module M2 and the second reflector 60 of the second optical path module M3 have first and second optical axes Z1 and Z2, respectively, and the first and second optical axes Z1 and Z2 intersect the beamsplitting side 20a of the first beamsplitter 20 and the beamsplitting side 50a of the second beamsplitter 50 at points P1 and P2, respectively, a principal axis Z passing through the points P1 and P2.

The first beamsplitter 20 of the first optical path module M2 is configured such that its beamsplitting side 20a forms first and second angles $\varphi$ and $\theta$ with the first optical axis Z1 of the first reflector 30 and the principal axis Z, respectively. In cases that the first and second angles $\varphi$ and $\theta$ are equal, a spatially relative positional relationship between the first beamsplitter 20 and the first reflector 30 of the first optical path module M2 can be changed.

The second beamsplitter 50 of the second optical path module M3 is configured such that its beamsplitting side 50a forms third and fourth angles $\alpha$ and $\beta$ with the second optical axis Z2 of the second reflector 60 and the principal axis Z, respectively. A range of the angle $\alpha$ is between $\beta-10°$ and $\beta+10°$, and the angle $\beta$ is between 11° and 79°, between 20° and 70°, between 30° and 60°, between 40° and 55°, and/or between 40° and 50° where a utilization efficiency of light energy is the highest. In the present application, the term "between" means endpoints are included.

According to the above principle of the present application, it should be understood by those skilled in the art that the present application provides an optical structure comprising the two optical path modules, instead of only one optical path module comprising one beamsplitter and one reflector as in the prior art, but the application is not limited to the structure only comprising two optical path modules and optical structures comprising more than two optical path modules are also within the protecting scope of the present application. In addition, the sequence and the number of times that the virtual image light VL passes through the beamsplitters and the reflectors in the optical path modules are not limited to those described in the three basic embodiments shown in the drawings, and various modifications are also considered to be within the scope of the present application and belong to the same inventive concept.

In the basic embodiments of the AR display device shown in FIGS. 2-4, each of the first and second reflectors 30 and 60 can have a basic structure described above, for example, comprising a reflector substrate and a reflective film integrated with reflector substrate. In the present specification, the term "integrated" means that objects are formed into a unitary piece by any method known in the art such as coating, laminating, bonding or photo-adhesive, or by structurally fixing.

Each of the reflectors 30 and 60 can be configured such that the virtual image light VL incident thereon reaches the semi-reflective film first and only a refracted portion of the light can reach the reflector substrate. Each of the reflectors 30 and 60 can also be configured such that the virtual image light VL incident thereon is transmitted through the reflector substrate before reaching the semi-reflective film of the reflector. This is more advantageous because the virtual image light VL is transmitted through the reflector substrate twice before being reflected by the reflector 30 or 60 back onto the corresponding beamsplitter 20 or 50, which further improves the freedoms of design of the optical system.

Figure 5:
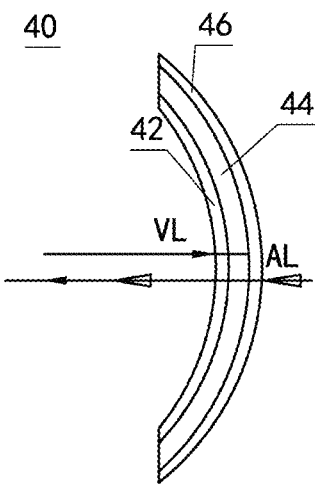
FIG. 5 shows an alternate embodiment of a reflector that can be used in an AR display device according to the present application.

More advantageously, the AR display devices according to the present application shown in FIGS. 2-4 have a first alternative embodiment, in which the first reflector 30 and/or the second reflector 60 is replaced with a reflector 40 as shown in FIG. 5. For clarity, FIG. 5 only shows a structure of the reflector, and the structure of other parts and the principle of light propagation are the same as those illustrated in FIGS. 2-4, and details are not described herein again.

The reflector 40 comprises an antireflection film 42, a reflector substrate 44 and a semi-reflective film 46 (when used in the first reflector 30, it can also be a total reflective film) which are integrated into a unity piece, the antireflection film 42 and the semi-reflective film 46 are provided on opposite sides of the reflector substrate 44, respectively. The antireflection film is configured for improving energy of light which enters the substrate and thereby improving the overall utilization efficiency of the light energy. With this configuration, the virtual image light VL incident on the reflector 40 passes through the antireflection film 42 first and then the reflector substrate 44, reaching the semi-reflective film 46 finally. The light VL is reflected by the semi-reflective film 46 and transmitted through the reflector substrate 44 and the antireflection film 42 again.

Compared with the foregoing structures, the antireflection film 42 provides two additional transmissions for the virtual image light VL during its propagation, which further improves the freedoms of design and lays a foundation for improving the optical performance of the AR display device.

In a variation (not shown) of the first alternative embodiment shown in FIG. 5, the reflector substrate 44 of the reflector 40 is replaced with a refractive correction substrate, and the reflector thus formed has a refraction correction function and thus is also known as a refractive lens reflector. The virtual image light VL incident on the reflector first reaches the substrate and then the semi-reflective film or reaches the semi-reflective film first and then the substrate, both of which can solve the problem of a refractive error of the human eye E when observing an image of the scene light AL. Further, in cases where the virtual image light VL reaches the substrate first and then the semi-reflective film, a curvature of field of the optical system can be corrected to some extent so that the human eye can observe a clearer image. In addition to providing the technical advantages described above, this configuration overcomes the drawbacks caused by the corrective lens between the beamsplitter and the human eye in the prior art: the complicated structure, the increased weight, more stray light, and loss of brightness. In one embodiment, the refractive correction substrate's diopter is 0~800°.

In the AR display devices described above, the first and second beamsplitters 20 and 50 of the first and second optical path modules M2 and M3 can be ordinary beamsplitters having no polarization function.

Figure 6:
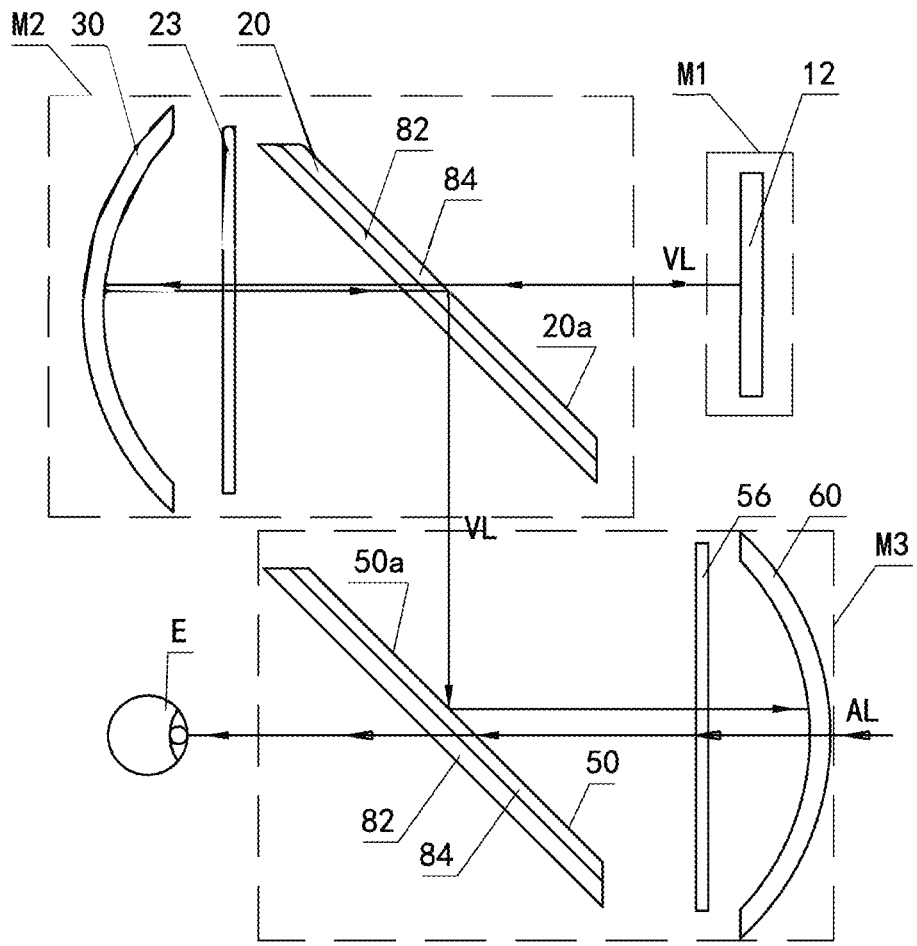
FIG. 6 shows an alternative embodiment of the AR display device of FIG. 2.

In a second alternative embodiment of the AR display device shown in FIG. 6, the first and second beamsplitters 20 and 50 of the first and second optical path modules M2 and M3 are each configured as polarizing beamsplitters having the polarization function. In the schematic diagram of FIG. 6, the first beamsplitter 20 and the second beamsplitter 50 are respectively shown as having a planar structure which comprises a beamsplitter substrate 82 and a polarizing beamsplitting film 84 integrated thereon, so that a polarized light having a polarization state in a first direction can pass through while reflecting a polarized light having a polarization state in a second direction perpendicular to the first direction at a beamsplitting side of the beamsplitter. The polarizing beamsplitting film defines the beamsplitting side of the beamsplitter, and the beamsplitter substrate is optional. In the specification of the present application, the first and second directions of the polarized lights are perpendicular to a propagation direction of the light, respectively, and the polarized lights will be described herein by taking P-polarized light and S-polarized light as an example. However, it should be understood by those skilled in the art that the polarized lights in the first and second directions are not limited to these, and they can be polarized lights in any two directions which are perpendicular to each other, for example, the polarized lights formed by respectively rotating the P polarized light and the S-polarized light by a certain angle around their propagation directions.

In the second alternative embodiment, the first optical path module M2 comprises a first wave plate subassembly 23 disposed between the first beamsplitter 20 and the first reflector 30, and the second optical path module M3 comprises a second wave plate subassembly 56 disposed between the second beamsplitter 50 and the second reflector 60.

Each of the first wave plate subassembly 23 and the second wave plate subassembly 56 can be configured as a quarter-wave plate. In the present application, the term "wave plate" can be a quarter-wave plate for converting an incident polarized light in the first direction to a circularly polarized light or converting an incident circularly polarized light to a polarized light in the second direction perpendicular to the first direction. The term "wave plate" can also be other wave plates or retarder films or optical devices capable of producing an additional optical path difference between two polarized lights which have polarization directions perpendicular to each other. The terms "beamsplitter wave plate" and "reflector wave plate" refer to a wave plate that can be integrated into a beamsplitter or a reflector, respectively. The wave plate or quarter-wave plate in the present application can have a planar structure or a curved structure, and specifically can have a cylindrical structure, a spherical structure, or other aspherical structures. The wave plate subassemblies 23 and 56 can be disposed between the respective beamsplitters and reflectors as shown, or can be bonded to and integrated with the corresponding reflectors into a unitary piece. The P-polarized light (in the first direction herein) and the S-polarized light (in the second direction herein) can be rotated around their propagation directions by 0 to 360° while maintaining the first and second directions perpendicular to each other, and, based on that, the polarizing beamsplitting films of the first and second beamsplitters 20 and 50 and the wave plate subassemblies are changed regarding to their mounting angles.

With the AR display device of the present embodiment, when the virtual image light VL emitted from the projection source 12 of the projection source module M1 and carrying the virtual image information is incident on the first beamsplitter 20 comprising the polarizing beamsplitting film, the P-polarized light of the virtual image light VL is transmitted through the first beamsplitter 20 and incident on the first wave plate subassembly 23 to be converted to the circularly polarized light (while the S-polarized light being reflected by the first beamsplitter 20), and the circularly polarized light is reflected by the first reflector 30 and then transmitted through the first wave plate subassembly 23 again, where the circularly polarized light is converted to the S-polarized light. The S-polarized light is incident on the first beamsplitter 20 and reflected towards the second beamsplitter 50 under the function of the polarizing beamsplitting film of the first beamsplitter 20. The S-polarized light is incident on and reflected by the second beamsplitter 50 and incident on the second wave plate subassembly 56, being converted to the circularly polarized light again by the second wave plate subassembly 56. The circularly polarized light is incident on the second reflector 60 and reflected by it onto the second wave plate subassembly 56 again, where the circularly polarized light is transmitted through the second wave plate subassembly 56 and converted to the P-polarized light again by the second wave plate subassembly 56. The P-polarized light is incident on the second beamsplitter 50 and enters the human eye E after passing through the second beamsplitter 50.

The scene light AL carrying the real scene information is incident into the second optical path module M3 from an outside of the second reflector 60 (the side opposite to the incident side of the virtual image light VL), transmitted through the second reflector 60 first and then the second wave plate subassembly 56. After that, the P-polarized light of the scene light AL is transmitted through the second beamsplitter 50 and enters the human eye E eventually. Thus, the human eye E can simultaneously observe the virtual image and the image of the real scene.

By configuring the beamsplitter 20 of the first optical path module M2 of the AR display device as the polarizing beamsplitter and providing the wave plate subassembly 23 accordingly, in the first optical path module M2, the virtual image light VL is transmitted through the first wave plate subassembly 23 after reflected by the first reflector 30 and converted to the S-polarized light by the first wave plate subassembly 23, and almost all the virtual image light VL is reflected onto the second beamsplitter 50 by the first beamsplitter 20 in the form of the S-polarized light, which substantially doubles the utilization efficiency of light energy compared with the first optical path module M2 with no polarization function in which nearly half of the light energy is lost at the first beamsplitter. Similarly, by configuring the beamsplitter 50 of the second optical path module M3 as the polarizing beamsplitter and providing the wave plate subassembly 56 accordingly, in the second optical path module M3, the virtual image light VL is transmitted through the second wave plate subassembly 56 after reflected by the second reflector 60 and converted to the P-polarized light by the second wave plate subassembly 56, and almost all the virtual image light VL is transmitted through the second beamsplitter 50 in the form of the P-polarized light and enters the human eye E, which substantially improves the utilization efficiency of light energy by three times compared with the second optical path module M3 in which only about one quarter of the light energy is left after the second beamsplitter.

As can be seen from FIG. 6, the AR display device in FIG. 6 is obtained by modifying the AR display device of FIG. 2, in particular through: configuring the first and second beamsplitters 20 and 50 of the first and second optical path modules M2 and M3 as the polarizing beamsplitters with the polarization function, and providing the first and second wave plate subassemblies between the first and second beamsplitters 20 and 50 and the first and second reflectors 30 and 60. It can be conceived that the AR display devices of FIGS. 3 and 4 can be modified similarly, including: configuring the first and second beamsplitters of the first and second optical path modules as the polarizing beamsplitters with the polarization function, and providing first and second wave plate subassemblies between the first and second beamsplitters and the first and second reflectors.

In a first form of the variation not shown in the drawings, as in FIG. 6, both the first and second beamsplitters are configured as polarizing beamsplitters which allows the polarized light in the first direction (e.g. the P-polarized light) to pass through and reflects the polarized light in the second direction (e.g. the S-polarized light), and first and second wave plate subassemblies which are as same as the first and second wave plate assemblies described above are provided between the first and second beamsplitters and the first and second reflectors. In this case, a half wave plate can be provided between the first optical path module M2 and the second optical path module M3 which is configured for converting the polarized light in one of the first and second directions directly to the polarized light in the other of the first and second directions, for example, for converting the P-polarized light to the S-polarized light. The half wave plate is configured for rotating the polarization direction of the polarized light which is transmitted through the wave plate by 90°, so that the virtual image light from the first optical path module can be transmitted through (for example, in a variation of the AR display device of FIG. 3) or reflected by (for example, in a variation of the AR display device of FIG. 4) the second beamsplitter.

In a second form of the variation not shown in the drawings, unlike FIG. 6, the first beamsplitter is configured as a polarizing beamsplitter which allows the polarized light in the first direction (e.g. the P-polarized light) to pass through and reflects the polarized light in the second direction (e.g. the S-polarized light), the second beamsplitter is configured as a polarizing beamsplitter which allows the polarized light in the second direction (e.g. the S-polarized light) to pass through and reflects the polarized light in the first direction (e.g. the P-polarized light). That is to say, the polarized lights the two beamsplitters allow to pass through have polarization directions perpendicular to each other, and the polarized lights the two beamsplitters reflect have polarization directions perpendicular to each other. The same first and second wave plate subassemblies as in FIG. 6 can be provided between the first and second beamsplitters and the first and second reflectors. This configuration enables the same functions as described above to be achieved without providing the half wave plate between the first and second optical path modules, and, that is to say, enables the virtual image light from the first optical path module to be transmitted through (for example, in a variation of the AR display device of FIG. 3) or reflected by (for example, in a variation of the AR display device of FIG. 4) the second beamsplitter.

Therefore, using the optical path modules having the polarization function shown in FIG. 6, in addition to all the foregoing technical advantages, the utilization efficiency of light energy of approximately eight times that provided in the three basic embodiments in FIGS. 2-4 is achieved, the brightness of image light is greatly enhanced, power consumption is saved, and system heat is reduced.

In a form not shown in the drawings, it should be understood by those skilled in the art that, although, in FIG. 6, both the beamsplitters 20 and 50 in the first and second optical path modules M2 and M3 are the polarizing beamsplitters and the wave plate subassemblies are disposed between the beamsplitters and the reflectors, the first beamsplitter 20 of the first optical path module M2 can be configured as the ordinary beamsplitter with no polarization function and correspondingly there is no first wave plate subassembly 23 disposed between the first beamsplitter 20 and the first reflector 30.

As described above, the second wave plate subassembly 56 of the second optical path module M3 can be disposed between the second beamsplitter 50 and the second reflector 60 as shown in FIG. 6, or it can be integrated together with the second reflector 60 into a unitary piece. In this case, the reflector 60 can comprise an antireflection film, a wave plate, an optional reflector substrate, and a semi-reflective film, which are arranged sequentially in the incident direction along which the virtual image light VL is incident on the reflector 60. This configuration can eliminate stray light to some extent. Alternatively, in this case, the reflector 60 may not comprise the reflector substrate, and the wave plate functions as the substrate.

Figure 7:
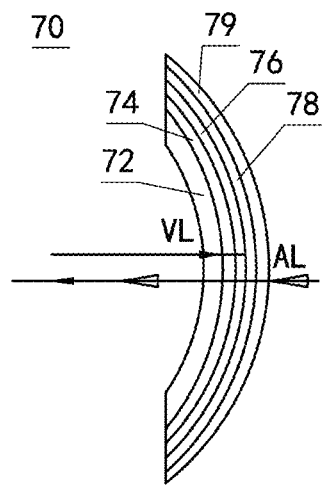
FIG. 7 shows an alternate embodiment of a reflector that can be used in the AR display device of FIG. 6.

FIG. 7 shows a schematic view of another reflector 70 that can be used as the second reflector 60 of the second optical path module M3. The reflector 70 is used to replace the second reflector 50 of FIG. 6 to form a third alternative embodiment. Along the incident direction along which the virtual image light VL from the second beamsplitter 50 is incident on the reflector 70, the reflector 70 comprises in turn or the virtual image light VL sequentially passes through, an antireflection film 72 (optional), a reflector substrate 74 (optional), a semi-reflective film 76, a wave plate 78, and a polarizing film 79. As described with respect to FIG. 6, the virtual image light VL from the second beamsplitter 50 is converted to the circularly polarized light by the second wave plate subassembly 56, and the circularly polarized light when incident on the reflector 70 is transmitted through the antireflection film 72 and the reflector substrate 74 first and then reaches the semi-reflective film 76. A portion of the circularly polarized light is reflected back by the semi-reflective film 76 and is transmitted through the second wave plate subassembly 56 and the second beamsplitter 50 into the human eye E, while a portion of the circularly polarized light which is not reflected by the semi-reflective film 76 reaches the wave plate 78 where it is converted to the P-polarized light and then absorbed by the polarizing film 79. Alternatively, the wave plate can be configured for converting the circularly polarized light incident on the wave plate 78 to the S-polarized light and the polarizing film 79 can be configured for absorbing the S-polarized light. In this way, no virtual image light VL carrying the virtual image information will be propagated out of the AR display device through the reflector 70, and thus a person other than a wearer who is wearing the AR display device cannot see the virtual image, which improves privacy. Not interfered by the outgoing light, others other than the wearer can make an eye contact with the wearer more easily, which improves social attributes. Moreover, due to the fact that no virtual image light VL is projected out of the reflector 70 and provided that the AR display device comprises an external protective lens, no virtual image light VL will be reflected by the protective lens back to the optical path module, and the interference associated with this is eliminated. It should be understood for those skilled in the art that the antireflection film and the reflector substrates are not necessary.

In the present application, the wave plate 78 and the polarizing film 79 in the reflector can be spaced apart from each other or can be closely bonded to each other.

In an embodiment not shown in the drawings, the wave plate 78 is curved in a lateral direction with regard to a head of the wearer of the AR display device and/or in a vertical (longitudinal) direction perpendicular to the lateral direction, and curved to substantially follow a shape of the reflector and, in particular, of the reflector substrate. This configuration can alleviate the interference of "ghost images" caused by the fact that a portion of the virtual image light VL is transmitted through the reflective film 76 of the second reflector and then incident on and reflected by the wave plate 78.

In another embodiment not shown in the drawings, the wave plate 78 can be curved to have a curved shape consistent with that of the reflective film 76 of the reflector. A unitary piece which is formed by bonding the wave plate 78 and the polarizing film 79 together and curved to the curved shape consistent with that of the reflective film 76 is itself bonded to the reflective film 76 with no gap, in order to help eliminate the interference of the "ghost images".

For the AR display device in FIG. 6, the second beamsplitter 50 of the second optical path module M3 can be configured as a polarizing beamsplitter further comprising a polarizing film to form a fourth alternative embodiment of the AR display device, the polarizing film being configured for passing through the polarized light having the polarization state in the first direction and absorbing the polarized light having the polarization state in the second direction. FIG. 8 illustrates a beamsplitter structure that can be used to replace the second beamsplitter 50 of FIG. 6, which is designated by a reference sign 80.

The beamsplitter 80 comprises a beamsplitter substrate 82 as same as the beamsplitter substrate 82 shown in FIG. 6, a polarizing film 86 and a polarizing beamsplitting film 84 as same as the polarizing beamsplitting film 84 shown in FIG. 6, and is configured such that the virtual image light VL from the first optical path module M2 is incident on the polarizing beamsplitting film 84 first and then on the polarizing film 86.

With this configuration, the S-polarized light in the virtual image light VL reflected from the first beamsplitter 20 of the first optical path module M2 is incident on the polarizing beamsplitting film 84 first. Due to the fact that the polarizing beamsplitting film 84 allows only the P-polarized light to pass through, almost all the incident S-polarized light is reflected towards the second wave plate subassembly 56. Therefore, adding the polarizing film 86 to the beamsplitter 80 has no substantial influence on the virtual image light VL carrying the virtual image information, and also has no significant influence on the scene light AL. All the technical advantages discussed above can be achieved with this beamsplitter structure.

For the interference light IL, when it is incident on the second beamsplitter 80 from the outside of the second beamsplitter 80 (the side opposite to the incident side of the virtual image light VL), it reaches the polarizing film 86 first. Due to the fact that the polarizing film is configured for absorbing the S-polarized light and passing through the P-polarized light, the P-polarized light of the interference light IL is transmitted through the polarizing film 86 and then the polarizing beamsplitting film 84, and almost all the S-polarized light of the interference light IL is absorbed by the polarizing film 86 and is not reflected towards the human eye E. This eliminates or substantially eliminates the interference light IL reflected into the human eye E, reduces or minimizes the interference caused by the interference light IL, and solves or improves the technical problem that the S-polarized light of the interference light IL is reflected into the human eye E by the polarizing beamsplitting film 84 and causes the interference if the polarizing film 86 is not provided (this problem exists for the structure in FIG. 6).

In the schematic diagram of FIG. 8, the polarizing film 86 is disposed between the beamsplitter substrate 82 and the polarizing beamsplitting film 84, but this is not necessary. This type of multilayer film polarizing beamsplitter may not comprise the beamsplitter substrate, or the relative positional relationship between the three components can be changed as long as it is ensured that the virtual image light VL from the first optical path module M2 be incident on the polarizing beamsplitting film first and then on the polarizing film and the interference light IL be incident on the polarizing film first and then on the polarizing beamsplitting film.

A fifth alternative embodiment of FIG. 8a differs from the fourth alternative embodiment of FIG. 7 in that, in addition to the beamsplitter substrate 82, the polarizing film 86 and the polarizing beamsplitting film 84 as same as those in FIG. 7, the polarizing beamsplitter 80 of FIG. 8 further comprises a wave plate 88 for changing a polarization direction of a polarized light. The wave plate is a quarter-wave plate which is common in the art and as described above, and these four components are integrated into a unitary piece, and sequentially bonded into the unitary piece, for example. The polarizing beamsplitter 80 is used to replace the second beamsplitter 50 of the second optical path module M3 of the AR display device in FIG. 6.

As shown in FIG. 8a, the beamsplitter 80 is configured such that the virtual image light VL (the S-polarized light) from the first optical path module M2 is sequentially incident on the polarizing beamsplitting film 84, the polarizing film 86, the wave plate 88 and the beamsplitter substrate 82. The polarizing beamsplitting film 84, the polarizing film 86 and the wave plate 88 have the relative positional relationship as described above, but the beamsplitter substrate 82 is not limited and can be changed with regard to its position. The S-polarized light, when incident on the polarizing beamsplitting film 84, is reflected towards the second wave plate subassembly 56 as described above, and the P-polarized light (if any) is sequentially transmitted through the polarizing beamsplitting film 84 and the polarizing film 86, and is converted to the circularly polarized light by the wave plate 88 which in turn is transmitted through the beamsplitter substrate 82 to the outside.

The P-polarized light which is converted to by the second wave plate subassembly 56 after being reflected by the second reflector 60 of the second optical path module M3 is incident on the second beamsplitter 50 again, where it is transmitted through the polarizing beamsplitting film 84 and the polarizing film 86 and is converted to the circularly polarized light by the wave plate 88. The circularly polarized light is transmitted through the reflector substrate 82 and enters the human eye E. For the circularly polarized light, when it passes through an interface between the beamsplitter 80 and air, in particular the interface between the beamsplitter substrate 82 and air, a small portion of the circularly polarized light is reflected at the interface within the beamsplitter substrate 82 due to parameter differences of the substrate material and the air. The reflected circularly polarized light is converted to the S-polarized light by the wave plate 88, and the S-polarized light can be absorbed by the polarizing film 86 adjacent to the wave plate 88. In this way, this configuration is advantageous for solving the "ghost images" interference problem resulted from the fact: due to imperfect manufacturing processes of optical devices including the polarizing film and the polarizing beamsplitting film (for example the beamsplitter comprising the substrate, the polarizing film and the polarizing beamsplitting film, but not comprising the wave plate), the P-polarized light is transmitted through the polarizing beamsplitting film 84, the polarizing film 86 and the beamsplitter substrate 82, and reflected at the interface between the beamsplitter substrate 82 and the air, the reflected P-polarized light is again transmitted through the polarizing film 86 and the polarizing beamsplitting film 84 and then through the second wave plate subassembly 56 (where it is converted to the circularly polarized light), the circularly polarized light is incident on and reflected by the second reflector 60, transmitted through the second wave plate subassembly 56, and converted to the S-polarized light by the second wave plate subassembly 56, and eventually a portion of the S-polarized light enters the human eye, generating the "ghost images".

With the beamsplitter 50 of FIG. 6 being replaced by the beamsplitter 80, the scene light AL enters the second optical path module M3 from the outside of the second reflector 60, and is sequentially transmitted through the second reflector 60, the second wave plate subassembly 56 and the second beamsplitter 80, entering the human eye E eventually.

For the interference light IL which is incident from the outside of the beamsplitter 80, at the second beamsplitter 80, it is transmitted through the beamsplitter substrate 82 and the wave plate 88, the P-polarized light in the interference light IL being transmitted through the polarizing film 86 and the polarizing beamsplitting film 84 and exiting the beamsplitter 80 and the S-polarized light being absorbed by the polarizing film 86.

The projection source module M1 that can be used in the various embodiments of the present application can comprise only the projection source 12 as previously described with reference to the drawings. Further, the projection source module M1 can further comprise a beam shaping element. In the present application, the "beam shaping element" is configured for shaping and integrating light it receives, and can be configured as a lens or a lens group. The lens or each lens of the lens group forming the beam shaping element can be a positive lens, a negative lens, or any combination of a positive lens and a negative lens, or the like. The lens or lens group can be spherical, aspherical or free-form curved. FIGS. 9a and 9b show beam shaping elements 14 formed by lenses of two different configurations. It should be understood that the description of the "beam shaping element" herein applies to the beam shaping element mentioned in any of the embodiments of the present application.

FIGS. 9a and 9b show two forms of a first alternative embodiment of the projection source module M1 described above. In the first alternative embodiment, the projection source module M1 comprises a planar projection source 12 and a beam shaping element 14 which are integrated directly (FIG. 9a) or indirectly via an intermediate matching component 16 (FIG. 9b) into a unitary piece. With the projection source and the beam shaping element integrated together, the formed optical structure is more compact, easier to assemble and adjust, and more systemic.

With the integrate projection source module M1, the light emitted from the projection source 12 and carrying the virtual image information enters the beam shaping element 14 directly, or enters the beam shaping element 14 in the form of the lens via the intermediate matching component 16 which is formed from a medium other than air. At an interface between the projection source 12 or the intermediate matching component 16 and the beam shaping element 14, a refractive index difference of mediums forming the two components is smaller than the refractive index difference between the medium of the lens forming the beam shaping element 14 and the air in FIG. 1, and thus more light is refracted, which improves the transmittance of light and improves the light efficiency of the projection source module. Correspondingly, the light reflected at the interface is reduced, which suppresses or reduces generation of stray light and ghost images.

In FIG. 9a, the projection source 12 and the beam shaping element 14 of the projection source module M1 are directly adhesively bonded or otherwise bonded together, and thus the formed structure is more compact than that in FIG. 9b.

The intermediate matching member 16 which integrates the projection source 12 and the beam shaping element 14 of the projection source module M1 together in FIG. 9b is made from a matching medium that is different from air and has a refractive index greater than 1. Optionally, the matching medium has a refractive index of 1 to 2.7. The greater the refractive index of the matching medium is, the smaller the generated airy disc is and the higher the imaging resolution is. Moreover, due to the increased refractive index of an image space, a relatively larger numerical aperture can be achieved with a relatively smaller aperture angle, a deflection angle of rim light is decreased, and design is simplified.

The matching medium of the intermediate matching member can be one or more selected from a group consisting of a liquid medium, a liquid crystal medium, a semi-solid medium, and a solid medium. The liquid medium can be a transparent medium such as water or alcohol. The solid medium can be a transparent solid medium such as glass. The matching medium can also comprise liquid resin and/or semi-solid resin and/or solid resin.

The intermediate matching component 16 shown in FIG. 9b is formed from a liquid and/or liquid crystal medium. Accordingly, the projection source module 10 comprises a sealing structure for sealing the liquid or liquid crystal medium between the projection source 12 and the beam shaping element 14. The sealing structure can be any suitable sealing structure in the art. The sealing frame 15 shown in FIG. 9b is an example. Seal between the sealing frame 15 and the projection source 12 is achieved by adhesion, and seal between the sealing frame 15 and the lens forming the beam shaping element 14 is achieved by an embedding engagement. Alternatively, depending on the form of the medium forming the intermediate matching member 16, the sealing frame 15 can also be adhered to the lens forming the beam shaping element 14. FIGS. 10a-10c illustrate three forms of a second alternative embodiment of a projection source module that can be used with the optical path module of any of the embodiments of the present application, in which the projection source module M1 comprises a curved projection source 12, for example, a curved display, to replace the planar projection source. The curved projection source can be matched with a natural curvature of field of the optical system to correct defects associated with the curvature of field to a great extent. Moreover, the virtual image light emitted from the curved projection source is more concentrated compared with the light emitted from the planar projection source and thus can be collected in a better way. Further, since the light emitted from the projection source is more concentrated, the lenses included in the optical path module can have a smaller size, and thus the entire optical system and the entire AR display device can be relatively compact.

In FIG. 10a, the projection source module M1 comprises only a curved projection source 12; in FIG. 10b, the projection source module M1 comprises a curved projection source 12 and a beam shaping element 14 that are integrated into a unitary piece; and in FIG. 10c, the projection source module M1 comprises a curved projection source 12 and a beam shaping element 14 which are integrated into a unitary piece via the intermediate matching member 16. Details on the technical advantages of providing the beam shaping element 14 for the projection source 12 as well as the technical advantages of integrating the two directly or indirectly have been described as above and will not be described again.

FIGS. 11a-11c show three forms of a third alternative embodiment of a projection source module that can be used with the optical path module of any of the embodiments of the present application. As shown in FIG. 1a, the projection source module M1 comprises a planar projection source 12 and a fiber optic panel 18 that are integrated or bonded together with no gap therebetween.

The fiber optic panel 18 comprises optical fibers having a wire diameter of the order of a few or a few hundred microns, or sometimes of the order of submicrons or millimeters or sub-millimeters. For example, the wire diameter can be much smaller than a size of pixels of the projection source 12 so that each pixel of the projection source 12 corresponds to a plurality of optical fibers and thus the human eye E cannot observe boundaries of the pixels through the optical system, which reduces a screen door effect and enables the image to be observed clearly.

When the virtual image light VL enters the fiber optic panel 18 from the projection source 12, the light traveling in various directions is modulated to propagate along the optical fibers in the fiber optic panel 18 and then projected out of the projection source module M1 via a light outgoing surface of the fiber optic panel 18. In this way, the fiber optic panel 18 can be selected or designed with regard to the shape of its light outgoing surface (e.g. a concave surface 18a in FIG. 11a, or a convex or flat surface) and distribution of the optical fibers in the fiber optic panel 18, according to a profile of the virtual image light VL that is expected to be projected out of the projection source module M1. This makes it easier to control the virtual image light VL, and the design of the projection source module M1 is simplified. Meanwhile, the fiber optic panel 18 and the projection source M1 are integrated together, which provides improved system integration.

When the light outgoing surface of the fiber optic panel 18 is curved (for example, FIG. 11a), similar to the aforementioned curved projection source, the projection source module M1 can provide the technical advantages which the curved projection source provides, e.g., matching the light VL with the curvature of field of the optical system and improving the image quality.

In FIGS. 11b and 11c, in addition to the planar projection source 12 and the fiber optic panel 18, the projection source module M1 further comprises a beam shaping element 14 directly (FIG. 11b) integrated therein or indirectly (FIG. 11c) integrated via an intermediate matching component 16.

In some embodiments of the present application, the projection source module M1 can further comprise a polarizing subassembly 13. For example, the polarizing subassembly 13 can be configured as a polarizing film or sheet for absorbing a polarized light in one direction in the virtual image light VL from the projection source 12 while passing through a polarized light in another direction perpendicular to the one direction; can be configured as a polarization converter, such as a polarization conversion sheet or film, for converting the polarized light in the one direction in the virtual image light VL to the polarized light in the another direction perpendicular to the one direction, so that the converted polarized light in the another direction being projected out of the projection source module M1 together with the original polarized light in the another direction; or can be configured as a specific type of wave plate. Thus, almost all the virtual image light VL entering the optical path module from the projection source module M1 is the polarized light in the desired polarization direction which is expected to enter the human eye via the first and second optical path modules. This substantially reduces the light which may be transmitted out through the second beamsplitter and observed from the outside, and reduces stray light. In this way, almost all the light energy can be utilized, the utilization efficiency of light energy is improved, and the virtual image observed by the human eye E is clearer. It should be appreciated for those skilled in the art that the description of the polarizing subassembly 13 herein applies to a polarizing subassembly for the projection source module M1 of any of the embodiments of the present application.

The polarizing subassembly 13 can be disposed between the projection source 12 and the beam shaping element 14, as shown in FIG. 12a, or between the beam shaping element 14 and the first beamsplitter 20 of the first optical path module M2, as shown in FIG. 12b. The polarizing subassembly 13 can be provided as a separate component as illustrated, can be bonded to a surface of the projection source 12 or a surface of the beam shaping element 14 with no gap, or can be bonded to a surface of the intermediate matching component 16 which is disposed optionally as described above.

In the present application, the projection source 12 of the projection source module M1 of the AR display device can be a projection source in which a light source and an image source are integrated together, examples of which can include, but are not limited to, OLED (Organic Light Emitting Diode) and LCD (Liquid Crystal display). The projection source 12 according to the present application can further comprise a light source and an image source which are separated from each other, and examples of the image source include, but are not limited to, LCOS (Liquid Crystal on Silicon), MEMS (Micro Electro Mechanical Display) and DMD (Digital Micromirror Device). The image sources need to be used with an additional light source.

Figure 13:
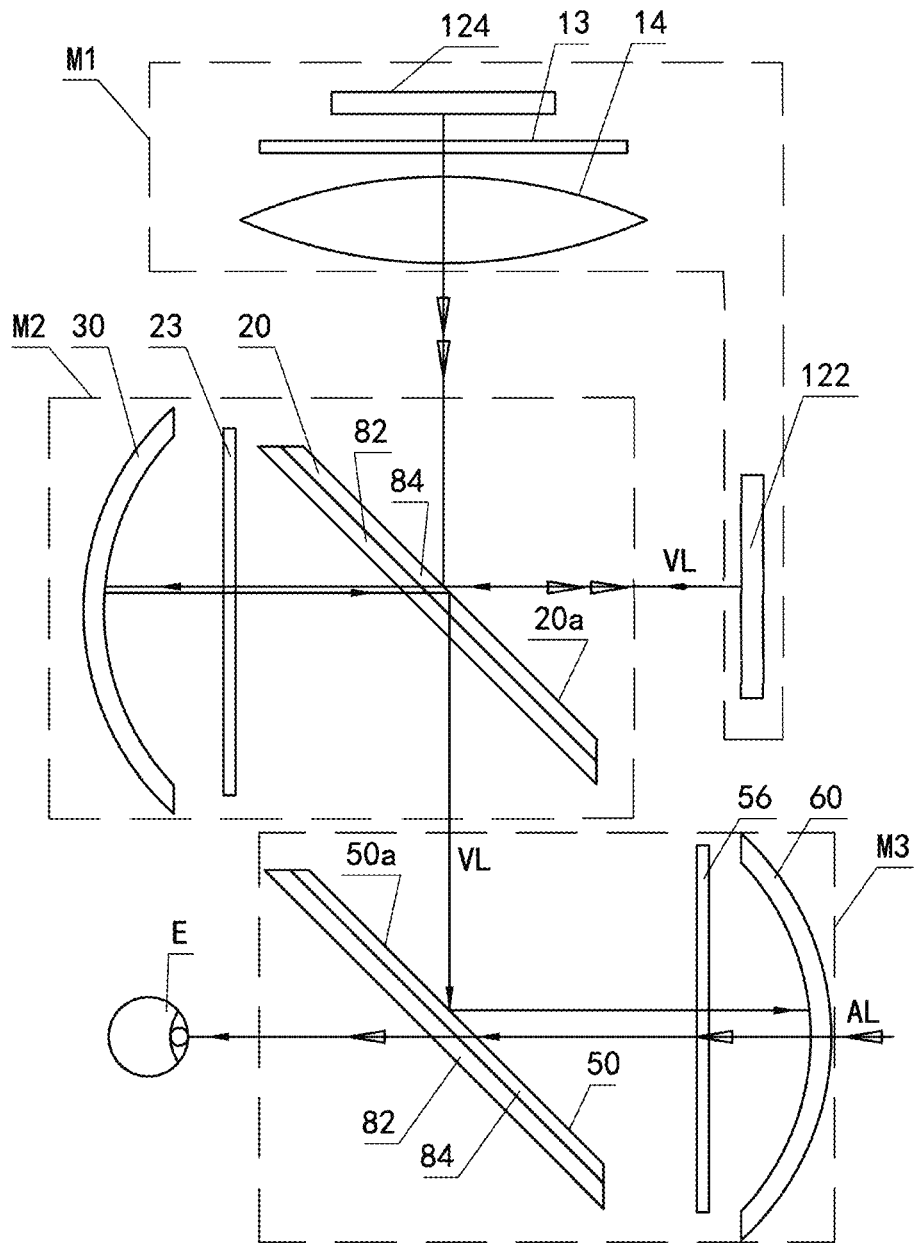
FIG. 13 shows another embodiment of an AR display device of the present application.

FIG. 13 shows an example in which a projection source of a projection source module M1 comprises an image source 122 and a separate additional light source 124. With the light source and the image source that are separate and not integrated together, the brightness of the image source is determined by the light source and can be improved by improving the brightness of the light source, which makes it easier to improve the brightness and lower the cost. In the illustrated embodiment, the image source 122 and the additional light source 124 are arranged separately, but this is not necessary. These two components can be arranged together or even closely bonded to each other. The first optical path module M2 and the second optical path module M3 in this embodiment are the same as those shown in FIG. 6, and are not described herein again.

In particular, in the embodiment of FIG. 13, the projection source module M1 further comprises the polarizing subassembly 13 described as above with reference to FIGS. 12a and 12b, the polarizing subassembly 13 being disposed between the light source 124 and the beam shaping element 14. In cases that the polarizing subassembly 13 is provided as a polarization conversion sheet, the utilization efficiency of light energy can be approximately doubled, and in cases that the polarizing subassembly 13 is provided as a polarization sheet, stray light can be reduced and ghost images can be eliminated. It should be appreciated for those skilled in the art that the polarizing subassembly 13 and the beam shaping element 14 are not necessary and can be omitted.

As previously mentioned, the beamsplitter of the present application can be a planar beamsplitter as previously described with reference to the drawings, and it can also be provided as a cubic beamsplitter. In an embodiment shown in FIG. 14, the first beamsplitter 20 of the first optical path module M2 is a cubic polarizing beamsplitter in which its beamsplitting side is formed by bonding a polarizing beamsplitting film, while the second beamsplitter 50 of the second optical path module M3 is provided as a planar polarizing beamsplitter. Obviously, the second beamsplitter 50 of the second optical path module M3 can also be replaced with a cubic polarizing beamsplitter.

Figure 14:
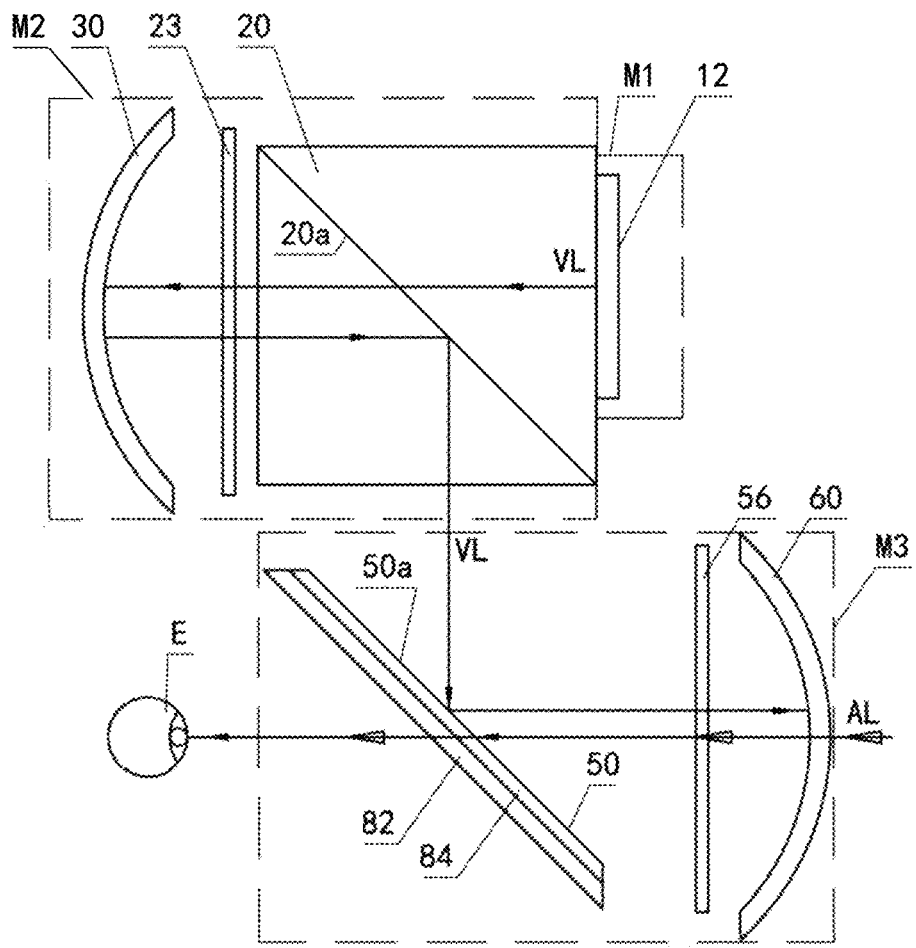
FIG. 14 shows still another embodiment of an AR display device of the present application.

Typically, the cubic polarizing beamsplitter is formed by bonding the polarizing beamsplitting film. The projection source 12 and the cubic polarizing beamsplitter 20 can be spaced apart from each other, but the projection source 12 and the cubic polarizing beamsplitter 20 can be bonded together, as shown in FIG. 14, so that the light emitted out of the projection source 12 can directly enter the polarizing beamsplitter. This decreases the refractive index difference at the interface, improves the light transmittance of the cubic polarizing beamsplitter, improves the light efficiency, and suppresses the generation of stray light and ghost images to some extent.

Typically, the refractive index of the cubic polarizing beamsplitter is between 1.3 and 2.0, and physical distances between the optical devices can be reduced under the same optical path (the refractive index multiplied by the distance). Meanwhile, using the cubic polarizing beamsplitter, an optical aberration of the optical system can be balanced to some extent.

It can be known, from a formula $R=(0.61*\lambda)/(S*\sin\theta)$ (where R is a radius of an airy disc, $\lambda$ is a wavelength of light, S is a refractive index of an image space, and $\theta$ is an incident aperture angle), that the configuration described herein can provide an increased refraction index of the image space, a reduced airy disc, and an improved imaging resolution. As described above with respect to the intermediate matching member, this configuration enables a relatively larger numerical aperture to be achieved with a relatively smaller aperture angle, decreases a deflection angle of rim light, and simplifies the design.

Figure 15:
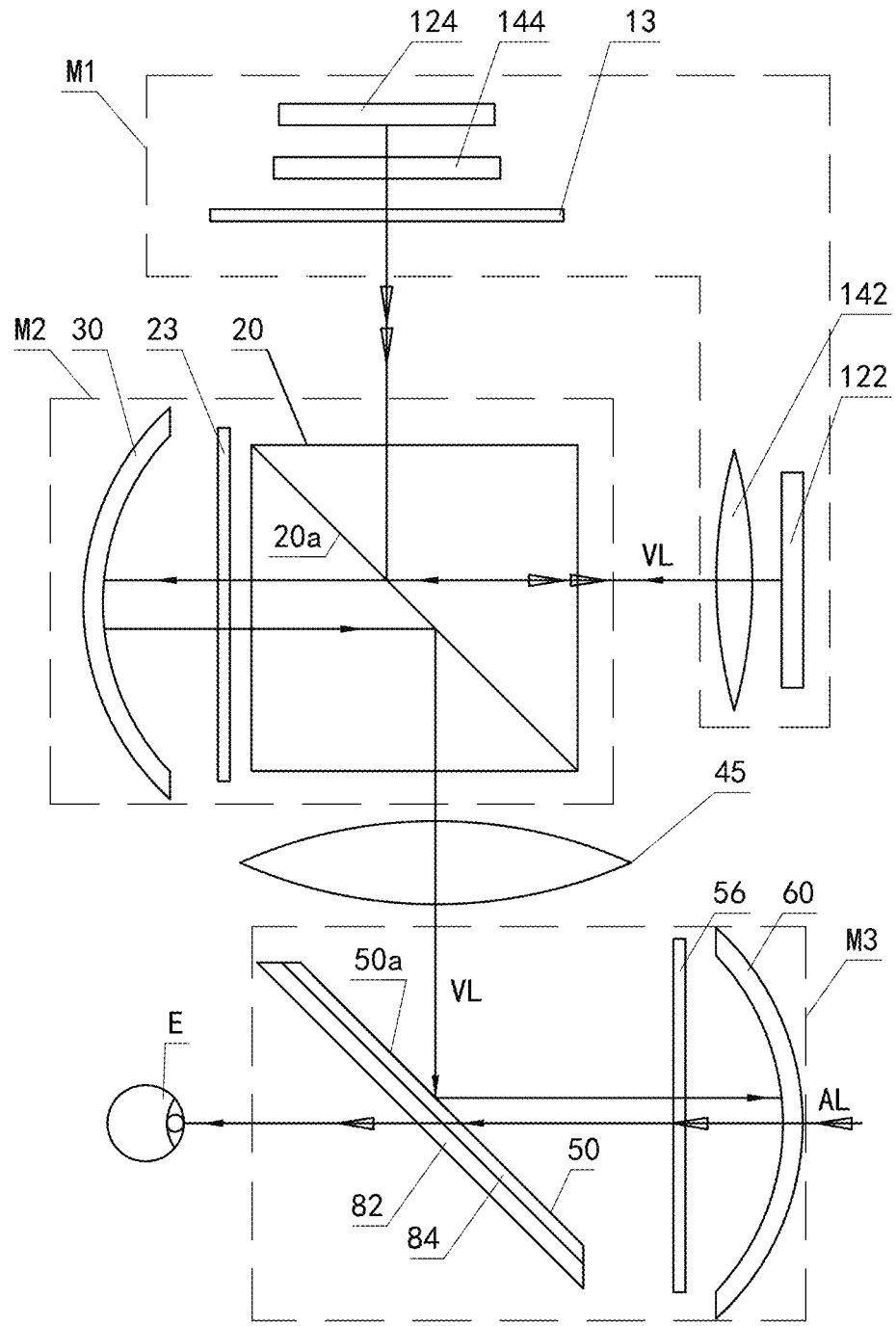
FIG. 15 shows yet another embodiment of an AR display device of the present application.

Yet another embodiment of an AR display device is shown in FIG. 15.

A projection source module M1 of the AR display device of the present embodiment comprises an image source 122 and a light source 124 which are separate from each other. In particular, the light source 124 can be a RED, GREEN and BLUE (RGB) Light Source. The projection source module M1 further comprises a first beam shaping element 142 in the form of a lens disposed between the image source 122 and the first beamsplitter 20 of the first optical path module M2, and a polarizing subassembly 13 and a second beam shaping element 144 in the form of a lens which are disposed between the light source 124 and the first beamsplitters 20 of the first optical path module M2. In FIG. 15, the first beam shaping element 142 and the second beam shaping element 144 are lenses in different forms. However, this is merely an example, and any form of lenses can be used as needed, such as a Fresnel lens.

Different from any of the embodiments described above, in the embodiment shown in FIG. 15, between the first optical path module M2 (specifically, its first beamsplitter 20) and the second optical path module M3 (specifically, its second beamsplitter 50) is provided an intermediate lens 45, which is configured for providing one more transmission for the light entering the second optical path module M3 from the first optical path module M2, so as to improve the freedoms of design to some extent. According to actual demands, the intermediate lens 45 can be any form of lens or lens group, can be any form of positive lens, negative lens, or any combination thereof, and can have a concave surface, a convex surface or an arbitrary curved surface, etc. For example, the intermediate lens 45 can be a Fresnel Lens.

Light emitted from the light source 124 (indicated by double hollow arrows) passes through the second beam shaping element 144 and the polarizing subassembly 13, wherein the P-polarized light of the light is absorbed or converted to the S-polarized light. The S-polarized light is incident on the first beamsplitter 20, reflected by the first beamsplitter 20, transmitted through the first beam shaping element 142, and incident onto the image source 122, thereby illuminating the image source 122. Here, the image source 122 can be Lcos, which can modulate the S-polarized light to form the virtual image light VL with the P-polarized light as an effective image light.

The virtual image light VL emitted from the image source 122 and carrying the virtual image information is incident on the first beamsplitter 20 after being shaped or integrated by the first beam shaping element 142. The P-polarized light in the light is transmitted through the first beamsplitter 20, converted to the circularly polarized light by the first wave plate subassembly 23, then reflected by the first reflector 30, then transmitted through the first wave plate subassembly 23 and converted to the S-polarized light, and then incident on and reflected by the first beamsplitter 20. At this point, most (if not all) of the S-polarized light is reflected onto and transmitted through the intermediate lens 45, into the second optical path module M3. In the second optical path module M3, the light is incident on and reflected by the second beamsplitter 50 first, then transmitted through the second wave plate subassembly 56 and converted to the circularly polarized light by it, and directed to the second reflector 60. At the second reflector 60, the circularly polarized light is reflected and again transmitted through the second wave plate subassembly 56 to become the P-polarized light, and the P-polarized light is then transmitted through the second beamsplitter 60 and enters the human eye E.

The embodiments shown in the drawings and some embodiments not shown in the drawings have been described as above. It is emphasized that the optical structures of the different modules described with reference to the different embodiments can be recombined to form new embodiments. All of the new embodiments are within the protecting scope as defined by the appended claims.

What is claimed is:

1. An augmented reality display device comprising:
   a projection source module comprising a projection source;
   a first optical path module comprising a first beamsplitter and a first reflector; and
   a second optical path module comprising a second beamsplitter and a second reflector,
   wherein the first beamsplitter and the second beamsplitter each comprise a beamsplitter substrate, and the first reflector and the second reflector each comprise a reflective film,
   wherein virtual image light emitted from the projection source module and carrying virtual image information passes through the first optical path module first, in which the virtual image light is reflected at least twice and transmitted at least once by means of the first beamsplitter and the first reflector, then enters the second optical path module, in which the virtual image light is transmitted at least once and reflected at least twice by means of the second beamsplitter and the second reflector, and enters a human eye eventually,
   wherein the first reflector of the first optical path module and the second reflector of the second optical path module have first and second optical axes, respectively, and the first and second optical axes intersect a beamsplitting side of the first beamsplitter and a beamsplitting side of the second beamsplitter at two points, respectively, wherein a principal axis passes through the two points, wherein the second beamsplitter of the second optical path module is configured such that its beamsplitting side forms a first angle a with the second optical axis of the second reflector and forms a second angle β with the principal axis, wherein a range of the angle α is between β-10° and β+10, and
   wherein scene light from a real scene enters the human eye through the second optical path module.

2. The augmented reality display device of claim 1, wherein the virtual image light from the projection source module, along a propagation path:
   enters the first optical path module first, in which the virtual image light is sequentially transmitted through the first beamsplitter, reflected by the first reflector, and then reflected by the first beamsplitter, exiting the first optical path module; and then enters the second optical path module, in which the virtual image light is sequentially reflected by the second beamsplitter, reflected by the second reflector, and then transmitted through the second beamsplitter, exiting the second optical path module and entering the human eye eventually;
   enters the first optical path module first, in which the virtual image light is sequentially transmitted through the first beamsplitter, reflected by the first reflector; and then reflected by the first beamsplitter, exiting the first optical path module; and then enters the second optical path module, in which the virtual image light is sequentially transmitted through the second beamsplitter, reflected by the second reflector, and then reflected by the second beamsplitter, exiting the second optical path module and entering the human eye eventually;
   enters the first optical path module first, in which the virtual image light is sequentially reflected by the first beamsplitter, reflected by the first reflector, and then transmitted through the first beamsplitter, exiting the first optical path module; and then enters the second optical path module, in which the virtual image light is sequentially reflected by the second beamsplitter, reflected by the second reflector, and then transmitted through the second beamsplitter, exiting the second optical path module and entering the human eye eventually; or
   enters the first optical path module first, in which the virtual image light is sequentially reflected by the first beamsplitter, reflected by the first reflector, and then transmitted through the first beamsplitter, exiting the first optical path module; and then enters the second optical path module, in which the virtual image light is sequentially transmitted through the second beamsplitter, reflected by the second reflector, and then reflected by the second beamsplitter, exiting the second optical path module and entering the human eye eventually.

3. The augmented reality display device of claim 1, wherein the projection source is a planar projection source or a curved projection source;
   wherein the projection source module further comprises a beam shaping element configured for shaping the virtual image light from the projection source, the beam shaping element and the projection source being spaced apart from each other, or the beam shaping element and the projection source being directly bonded and integrated into a unitary piece with no gap therebetween; or
wherein the projection source module further comprises a beam shaping element configured for shaping the virtual image light from the projection source, the beam shaping element being integrated with the projection source into a unitary piece indirectly via an intermediate matching component.

4. The augmented reality display device of claim 1, wherein the projection source is a planar projection source with a fiber optic panel integrated thereon, the fiber optic panel being configured for receiving the virtual image light from the projection source.

5. The augmented reality display device of claim 4, wherein the projection source module further comprises a beam shaping element for shaping the virtual image light from the fiber optic panel, the beam shaping element and the fiber optic panel being spaced apart from each other, or the beam shaping element and the fiber optic panel being directly bonded and integrated into a unitary piece with no gap therebetween.

6. The augmented reality display device of claim 4, wherein the projection source module further comprises a beam shaping element configured for shaping the virtual image light from the fiber optic panel, the beam shaping element being integrated with the fiber optic panel into a unitary piece indirectly via an intermediate matching component.

7. The augmented reality display device of claim 1, wherein the projection source is an integrated projection source, such as OLED or LCD; or
wherein the projection source comprises a light source and an image source which are separated from each other, wherein the image source is LCOS, MEMS or DMD image source.

8. The augmented reality display device of claim 1, wherein the first beamsplitter and the second beamsplitter each are configured as polarizing beamsplitters comprising a polarizing beamsplitting film, and a first wave plate subassembly and a second wave plate subassembly are disposed between the first beamsplitter and the first reflector of the first optical path module and between the second beamsplitter and the second reflector of the second optical path module, respectively.

9. The augmented reality display device of claim 8, wherein both the first beamsplitter and the second beamsplitter are configured to allow a polarized light in a first direction to pass through while reflecting a polarizing light in a second direction, the first direction being perpendicular to the second direction;
wherein a half wave plate is provided between the first optical path module and the second optical path module.

10. The augmented reality display device of claim 8, wherein the first beamsplitter is configured to allow a polarized light in a first direction to pass through while reflecting a polarized light in a second direction, and the second beamsplitter is configured to allow the polarized light in the second direction to passes through while reflecting the polarized light in the first direction, the first direction being perpendicular to the second direction.

11. The augmented reality display device of claim 9, wherein the second beamsplitter further comprises a polarizing film which is configured to allow the polarized light in the first direction to pass through while absorbing the polarized light in the second direction, the virtual image light from the first optical path module being incident on the polarizing beamsplitting film first and then on the polarizing film.

12. The augmented reality display device of claim 11, wherein the second beamsplitter further comprises a beamsplitter wave plate, the virtual image light incident on the second beamsplitter being sequentially incident on the polarizing beamsplitting film, the polarizing film and the beamsplitter wave plate.

13. The augmented reality display device of claim 9, wherein the projection source module further comprises a projection source polarizing subassembly, the virtual image light from the projection source being incident on the polarizing subassembly first and then projected out of the projection source module.

14. The augmented reality display device of claim 13, wherein the projection source polarizing subassembly is disposed between the projection source and the first beamsplitter of the first optical path module;
the projection source module comprises a beam shaping element configured for shaping the virtual image light from the projection source, the projection source polarizing subassembly being disposed between the projection source and the beam shaping element or between the beam shaping element and the first beamsplitter of the first optical path module; or
the projection source comprises a light source and an image source which are separated from each other, the projection source polarizing subassembly being disposed between the light source and the first beamsplitter of the first optical path module.

15. The augmented reality display device of claim 13, wherein the projection source polarizing subassembly is a polarizing film and/or a polarizing beamsplitting film and/or a projection source wave plate.

16. The augmented reality display device of claim 8, wherein either or both of the first reflector and the second reflector further comprises a reflector substrate, the reflective film being disposed on either side of the reflector substrate,
wherein a reflective side of the first reflector is provided by a total reflective film or a semi-reflective film, and the reflective film of the second reflector is provided by a semi-reflective film, wherein either or both of the first reflector and the second reflector further comprises an antireflection film, the virtual image light from the second beamsplitter and the second wave plate subassembly when incident on the corresponding reflector being transmitted through the antireflection film of the reflector first and then entering the reflector substrate and the semi-reflective film.

17. The augmented reality display device of claim 8, wherein the second reflector further comprises a reflector wave plate and a reflector polarizing film, for the virtual image light incident on the second reflector from the second beamsplitter and the second wave plate subassembly, a portion of the light which is transmitted through the reflective film of the second reflector being transmitted through the reflector wave plate of the second reflector and converted to a polarization light which can be absorbed by the reflector polarizing film and then being absorbed by the reflector polarizing film.

18. The augmented reality display device of claim 17, wherein the reflector wave plate and the reflector polarizing film are integrally curved in a lateral direction of a head of a wearer wearing the augmented reality display device and/or in a longitudinal direction perpendicular to the lateral direction, to substantially follow the shape of the second reflector.

19. The augmented reality display device of claim 8, wherein the second reflector further comprises an outermost protective lens along an incident direction of the virtual image light incident onto the second reflector from the second beamsplitter, the protective lens being a light energy attenuating lens or an electrochromic lens or a photochromic lens.

20. A wearable augmented reality system comprising an augmented reality display device according to claim 1.

* * * * *